United States Patent [19]

Reik et al.

[11] Patent Number: 5,293,978
[45] Date of Patent: Mar. 15, 1994

[54] APPARATUS FOR TRANSMITTING TORQUE IN THE POWER TRAINS OF MOTOR VEHICLES

[75] Inventors: Wolfgang Reik, Bühl Baden; Johann Jäckel, Baden-Baden, both of Fed. Rep. of Germany

[73] Assignee: Luk Lamellen und Kupplungsbau GmbH, Buhl, Fed. Rep. of Germany

[21] Appl. No.: 946,527

[22] Filed: Sep. 16, 1992

Related U.S. Application Data

[62] Division of Ser. No. 708,934, May 31, 1991, Pat. No. 5,160,007.

[30] Foreign Application Priority Data

| May 31, 1990 | [DE] | Fed. Rep. of Germany | 4017519 |
| Jun. 29, 1990 | [DE] | Fed. Rep. of Germany | 4020759 |
| Aug. 31, 1990 | [DE] | Fed. Rep. of Germany | 4027542 |
| Aug. 31, 1990 | [DE] | Fed. Rep. of Germany | 4027593 |
| Aug. 31, 1990 | [DE] | Fed. Rep. of Germany | 4027614 |
| Aug. 31, 1990 | [DE] | Fed. Rep. of Germany | 4027629 |
| Dec. 24, 1990 | [DE] | Fed. Rep. of Germany | 4041709 |
| Dec. 24, 1990 | [DE] | Fed. Rep. of Germany | 4041722 |

[51] Int. Cl.$^5$ .......................... F16D 3/66; F16D 3/14
[52] U.S. Cl. .................. 192/70.17; 192/106.2; 74/574; 464/66
[58] Field of Search .......... 192/70.17, 106.2; 464/66, 68; 74/574

[56] References Cited

U.S. PATENT DOCUMENTS

| 4,555,009 | 11/1985 | Habel et al. | 192/106.2 |
| 4,809,830 | 3/1989 | Schierling et al. | 192/106.2 X |
| 4,978,324 | 12/1990 | Casse | 464/68 |
| 5,042,632 | 8/1991 | Jackel | 192/106.2 |
| 5,135,092 | 8/1992 | Jackel | 192/106.2 |
| 5,146,811 | 9/1992 | Jackel | 192/106.2 X |
| 5,150,777 | 9/1992 | Friedmann | 192/70.17 |
| 5,156,249 | 10/1992 | Friedmann | 192/106.2 |
| 5,160,007 | 11/1992 | Reik et al. | 192/70.17 |

FOREIGN PATENT DOCUMENTS

| 0147136 | 7/1985 | European Pat. Off. | 464/68 |
| 3607751 | 9/1987 | Fed. Rep. of Germany | 464/68 |
| 3732818 | 4/1988 | Fed. Rep. of Germany | 464/68 |
| 3902110 | 7/1990 | Fed. Rep. of Germany | 192/106.1 |
| 2066415 | 7/1981 | United Kingdom | 464/68 |
| 2098702 | 11/1982 | United Kingdom | 464/68 |
| 2180322 | 3/1987 | United Kingdom | 464/68 |

*Primary Examiner*—Leslie A. Braun
*Assistant Examiner*—Andrea Pitts
*Attorney, Agent, or Firm*—Darby & Darby

[57] ABSTRACT

An apparatus for transmitting torque between the output element of an internal combustion engine and the input element of a variable-speed transmission in a motor vehicle has a first flywheel which is screwed or bolted to the output element and a second flywheel which is coaxial with and rotatable relative to the first flywheel and is connected to the input element by the clutch plate of a friction clutch. One or more dampers are provided in a lubricant-containing annular chamber of the first flywheel to oppose rotation of the flywheels relative to each other, and each damper has an annulus of arcuate coil springs acting in the circumferential direction of the flywheels. The cover of the clutch has stressing arms which extend into the chamber and engage the springs.

24 Claims, 9 Drawing Sheets

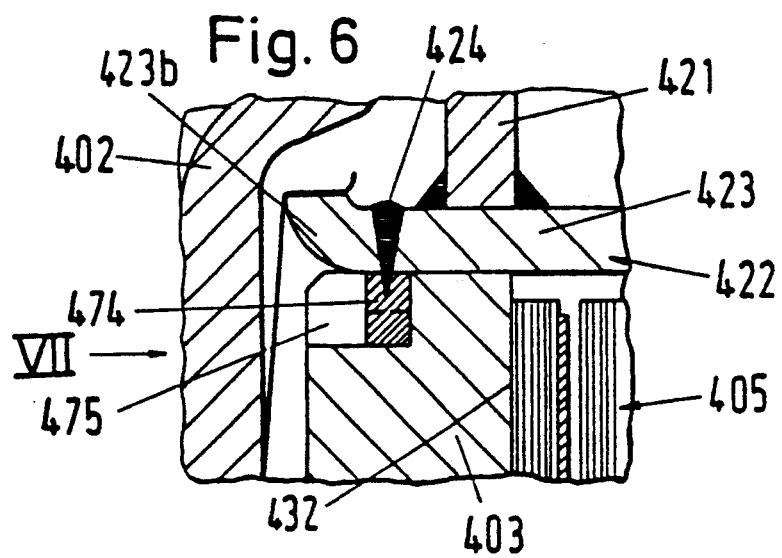
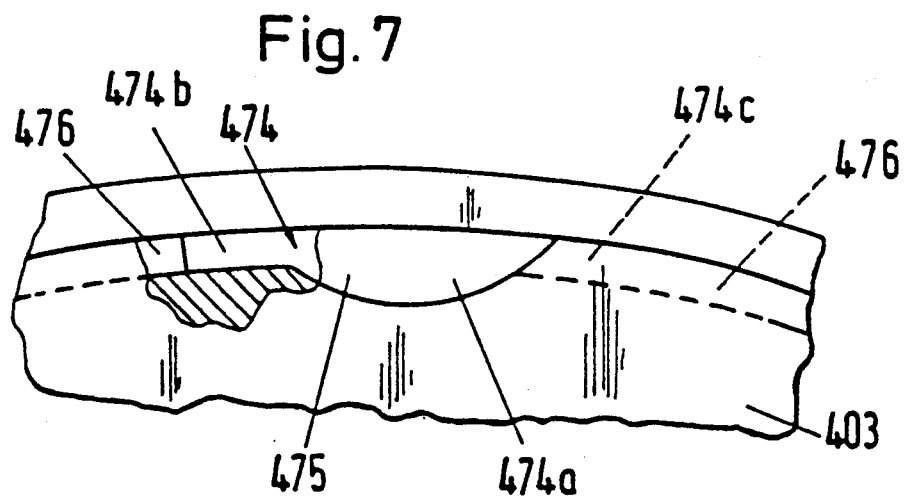
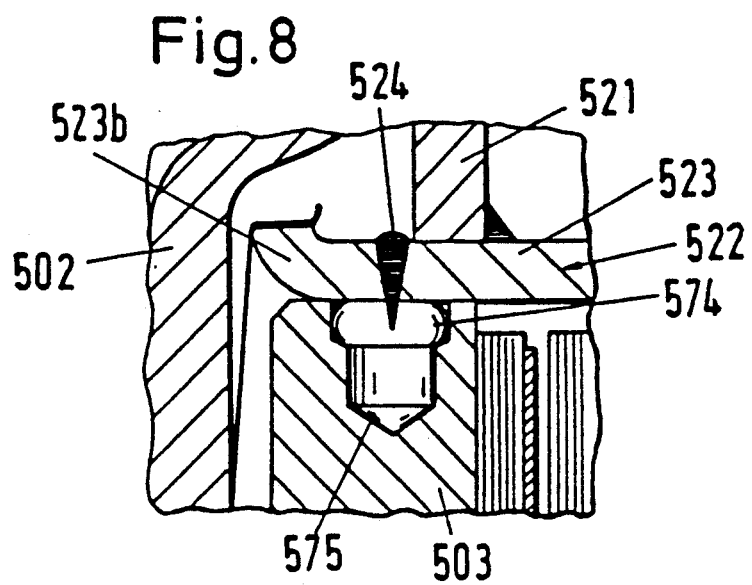

APPARATUS FOR TRANSMITTING TORQUE IN THE POWER TRAINS OF MOTOR VEHICLES

This application is a divison of application Ser. No. 07/708,934, filed May 31, 1991 now U.S. Pat. No. 5,160,007.

BACKGROUND OF THE INVENTION

The invention relates to improvements in torque transmitting apparatus, especially to apparatus which can be used to transmit torque between the engine and the variable-speed transmission of a motor vehicle.

German patent application No. 37 21 706 of Wolfgang Reik (published Jan. 7, 1988 discloses a torque transmitting apparatus wherein a first flywheel is connected to the rotary output element of an engine and a second flywheel is connected with the input element of a variable-speed transmission by way of a friction clutch. An antifriction roller bearing is interposed between the two flywheels and a damper is employed to oppose rotation of the flywheels relative to each other. The damper is installed in an annular chamber which is defined in part by the first flywheel and includes energy storing elements acting in the circumferential direction of the flywheels. The chamber is at least partially filled with a viscous fluid and is at least substantially sealed from the surrounding atmosphere. The friction clutch has a cover which is secured to the second flywheel.

Torque transmitting apparatus employing composite flywheels of the above outlined character have found wide acceptance in the automobile industry. Such apparatus are used primarily in motor vehicles with ample room below the hood, particularly in motor vehicles of the type wherein the engine block and the transmission extend in the direction of forward movement of the vehicle. Heretofore known torque transmitting apparatus of the above outlined character are less satisfactory for use in motor vehicles wherein the space beneath the hood is at a premium, especially in motor vehicles of the type wherein the combustion engine and the variable-speed transmission are installed to extend transversely of the direction of forward movement of the vehicle. On the other hand, torque transmitting apparatus of the above outlined character exhibit a number of important advantages so that there exists an urgent need for apparatus which embody the above-enumerated features and can be utilized in practically all kinds of vehicles including those with engine-transmission assemblies extending in, and those with engine-transmission assemblies extending transversely of, the direction of forward movement of the vehicle.

OBJECTS OF THE INVENTION

An object of the invention is to provide a torque transmitting apparatus which constitutes an improvement over and a further development of apparatus disclosed in published German patent application No. 37 21 706.

Another object of the invention is to provide a torque transmitting apparatus which can be used in motor vehicles having longitudinally or transversely extending engine-transmission assemblies without occupying any additional space, or much additional space, beneath the hood.

A further object of the invention is to provide a torque transmitting apparatus which is constructed and assembled in such a way that it can be installed in a motor vehicle within a short interval of time and by resorting to available tools.

An additional object of the invention is to provide the apparatus with novel and improved means for reducing the dimensions in the axial direction of the flywheels.

Still another object of the invention is to provide the torque transmitting apparatus with novel and improved means for preventing overheating of certain parts.

Another object of the invention is to provide the apparatus with novel and improved means for sealing the supply of viscous fluid in the chamber for the damper or dampers between the flywheels.

A further object of the invention is to provide an apparatus which is ideally suited for use in motor vehicles with longitudinally extending engine-transmission assemblies as well as in motor vehicles with transversely extending engine-transmission assemblies.

Another object of the invention is to provide a torque transmitting apparatus wherein the flywheels occupy a minimal amount of space.

An additional object of the invention is to provide a torque transmitting apparatus which renders it possible to achieve optimal torque transmitting and damping rates.

Another object of the invention is to provide a simple, compact and inexpensive torque transmitting apparatus which can be used in existing types of motor vehicles.

A further object of the invention is to provide the above outlined apparatus with novel and improved means for securing the friction clutch to one of the flywheels.

An additional object of the invention is to provide a novel and improved method of assembling the parts of the above outlined torque transmitting apparatus.

A further object of the invention is to provide a torque transmitting apparatus which is constructed and assembled in such a way that the parts which are used to secure one of the flywheels to the output element of the engine cannot be misplaced or lost during storage and/or during transport to an automobile assembling plant or to a repair shop.

Another object of the invention is to provide the torque transmitting apparatus with novel and improved means for preventing overheating of certain sensitive parts.

An additional object of the invention is to provide an apparatus which utilizes flywheels that can be mass-produced at a fraction of the cost of heretofore known flywheels.

Another object of the invention is to provide a torque transmitting apparatus wherein various rotary parts can be properly centered prior to installation in a motor vehicle.

A further object of the invention is to provide a motor vehicle which embodies the above outlined torque transmitting apparatus.

An additional object of the invention is to provide a novel and improved blank which can be subdivided into several component parts of the above outlined torque transmitting apparatus.

Another object of the invention is to provide the apparatus with novel and improved means for facilitating the placing of the flywheels into immediate or very close proximity to each other in order to enhance the compactness of the apparatus in the axial direction of the flywheels.

An additional object of the invention is to provide a torque transmitting apparatus which can be manipulated by semiskilled persons.

Another object of the invention is to provide the torque transmitting apparatus with novel and improved means for deforming or stressing the energy storing means of the damper or dampers in the liquid-containing chamber.

SUMMARY OF THE INVENTION

One feature of the present invention resides in the provision of a torque transmitting apparatus which can be used in motor vehicles. The improved apparatus comprises a first rotary flywheel which is connectable with an engine of the vehicle (e.g., to the rotary output element—such as a crankshaft—of an internal combustion engine), a second rotary friction wheel which is coaxial with the first flywheel and is connectable with the input shaft of a transmission in the vehicle, at least one antifriction (ball, roller, needle or like) bearing between the first and second flywheels, and at least one damper which is operative to oppose rotation of the first and second flywheels relative to each other and is disposed in an annular chamber defined at least in part by the first flywheel. The damper includes energy storing elements (e.g., coil springs) acting in the circumferential direction of the flywheels and the second flywheel is connectable to the input element of the transmission by a friction clutch having a cover which is affixed to the second flywheel and is provided with stressing portions extending into the annular chamber and engaging the energy storing elements of the at least one damper.

The stressing portions can but need not be integral with the cover of the friction clutch.

The apparatus preferably further comprises a supply of viscous fluid (e.g., oil or grease) which at least partially fills the annular chamber, and means for at least substantially sealing the chamber from the atmosphere. The sealing means can comprise an O-ring or another suitable sealing element which can be interposed between the outer side of the cover of the friction clutch and a component (e.g., a substantially radially extending annular wall) which defines a portion of the annular chamber. The sealing element can be mounted directly on the aforementioned component or wall. Alternatively, the sealing element can be mounted on the cover of the friction clutch.

The cover can at least partially surround the second flywheel. Such apparatus can comprise means (e.g., integral projections of the cover) for connecting the cover to the second flywheel at the peripheral surface of the second flywheel, i.e., the latter can be at least substantially or fully confined in the cover of the friction clutch.

The stressing portions for the energy storing elements of the at least one damper can be provided on one or more securing members which are affixed to the cover. The stressing portions can form integral parts of the securing member or members. The securing member or members can be affixed to the outer marginal portion of the cover.

A membrane can be used as a means for affixing the cover of the friction clutch to the second flywheel. The membrane can surround the second flywheel and can be secured to the outer marginal portion of the cover. For example, a portion of the membrane can be clamped between the outer marginal portion of the cover and the aforementioned securing member or members. The membrane can extend along that side of the second flywheel which confronts the first flywheel and faces away from the friction clutch. To this end, a portion of the membrane preferably extends radially of the first flywheel and along the aforementioned side of the second flywheel. Such side of the second flywheel can be provided with at least one ventilating channel which is overlapped by the radially extending portion of the membrane. The at least one channel has an inlet portion and an outlet portion and one of these inlet and outlet portions is nearer to and the other of such inlet and outlet portions is more distant from the at least one bearing and from the axis of the second flywheel. A portion of the membrane can serve as a means for centering the friction clutch relative to the second flywheel and vice versa.

The second flywheel has a substantially radially extending friction surface adjacent a clutch plate of the friction clutch. A pressure plate which rotates with the second flywheel is installed between the cover and the clutch plate of the friction clutch. The radially inner portion of the at least substantially sealed annular chamber can extend radially inwardly from the outermost toward but short of the innermost portion of friction surface on the second flywheel. The radially inner portion of the annular chamber preferably terminates at or short of a location midway between the radially innermost and outermost portions of the friction surface.

Two relatively large portions of the first and second flywheels are preferably located close to each other radially inwardly of the annular chamber to define a relatively narrow clearance, e.g., a clearance having a width of 1 to 4 mm. The clearance can extend radially outwardly from the common axis of the flywheels toward the radially inner portion of the annular chamber, e.g., at least to a location not less than halfway between the radially innermost and outermost portions of the friction surface on the second flywheel. The clearance is preferably adjacent a substantially disc-shaped portion of the first flywheel, and such disc-shaped portion is connected or is connectable directly to the rotary output element of the engine.

At least a portion of the friction surface on the second flywheel can be located in a plane which is normal to the axes of the flywheels and is adjacent or intersects the at least one bearing. Such bearing is located radially inwardly of the friction surface.

The aforementioned clearance between the two flywheels can serve as a ventilating path for the flow of a cooling air stream to reduce the transfer of heat from the friction surface of the second flywheel to the first flywheel.

That portion of the first flywheel which is adjacent the clearance can be provided with one or more openings which communicate with the clearance. The second flywheel can be provided with one or more openings which communicate with the clearance; such opening or openings can be provided radially inwardly and/or radially outwardly of the friction surface on the second flywheel.

That portion of the first flywheel which is adjacent the clearance and is connectable to the output element of the engine is preferably integral with an axially extending annular portion and surrounds the radially outermost portion of the annular chamber. The chamber is further bounded by the aforementioned component or wall which is adjacent to the annular portion of the chamber and is disposed radially outwardly of the friction surface on the second flywheel. The wall can surround the cover of the friction clutch or the aforementioned securing member or members.

The aforementioned sealing means can further comprise a seal which is disposed in the clearance between the first and second flywheels. Such seal can be installed to sealingly engage the first flywheel and the cover or to sealingly engage the first flywheel and the aforementioned securing member or members.

The means for fastening the first flywheel to the output element of the engine can be located radially inwardly of the at least one bearing. In accordance with a presently preferred embodiment, the fastening means can comprise a plurality of rotary fasteners (e.g., in the form of screws or bolts) which are located radially outwardly of the at least one bearing. The fasteners have heads at that (inner) side of the first flywheel which confronts the clearance and externally threaded shanks which extend through the respective openings and into tapped bores of the output element of the engine when the improved apparatus is properly installed in a motor vehicle. The second flywheel can be provided with openings which preferably extend in parallelism with the axes of the flywheels and are positioned to permit engagement of the heads of fasteners by a rotating (torque transmitting) tool, e.g., a manually operated or motor driven wrench.

The flywheels define an axial passage for a component (such as the aforementioned input shaft) of the transmission. The at least one bearing surrounds the passage and the aforementioned openings or holes of the first flywheel are located radially outwardly of the passage to receive the respective fasteners which serve to secure the first flywheel to the engine. As mentioned above, the openings or holes of the first flywheel can be located radially outwardly of the at least one bearing and can be in partial or full alignment with the opennings or holes of the second flywheel. This enables a torque transmitting tool to reach the heads of fasteners by extending through the openings or holes of the second flywheel.

One of the flywheels (e.g., the first flywheel) can be provided with an annular protuberance, and the at least one bearing is then mounted in such a way that it surrounds the protuberance. The arrangement may be such that the at least one bearing is provided with an inner race which surrounds the protuberance of the one flywheel, and with an outer race which surrounds the inner race and supports the other flywheel. The holes or openings of the first flywheel are preferably located radially outwardly of the inner and outer races of the at least one bearing. The protuberance can be an integral part of the one (first or second) flywheel.

The hub of the clutch plate can extend into the aforementioned axial passage of the flywheels.

The openings or holes in the second flywheel are preferably dimensioned in such a way that they afford access to but prevent the passage of the heads of registering fasteners. This ensures that, once the apparatus is assembled, the fasteners can be loosened to be detached from the output element of the engine but cannot be lost because their shanks are compelled to extend into the respective openings or holes of the first flywheel. If the heads of the fasteners are round and the holes or openings of the second flywheel are round, the diameters of the heads exceed the diameters of the holes or openings in the second flywheel.

The aforementioned protuberance can be made integral with the at least one bearing. For example, the inner or the outer race of the at least one bearing can be an integral part of the protuberance. The protuberance can be made integral with the first flywheel and can be integral with the outer race of the at least one bearing.

The flywheels and the friction clutch (including the cover, the pressure plate and the clutch plate) can constitute a preassembled unit which can be shipped to customers or stored prior or subsequent to shipment. The preassembled unit is ready to be affixed to the output element of an engine, and such unit preferably further comprises the at least one bearing. The means for preventing complete withdrawal of fasteners from the preassembled unit can comprise the second flywheel or other suitable means, e.g., one or more deformable parts which can yield when the fasteners are driven home to reliably connect the first flywheel to the crankshaft of an internal combustion engine.

The clutch plate of the friction clutch is preferably centered in the preassembled unit between the second flywheel and the pressure plate. This ensures that the axis of the clutch plate coincides with the axis of the rotary output element when the unit is propery attached to the engine.

If necessary, the clutch plate and/or the pressure plate of the friction clutch can be provided with holes or bores which afford access to the heads of fasteners at the inner side of the aforementioned substantially disc-shaped portion of the first flywheel. When the clutch plate is properly centered between the second flywheel and the pressure plate, its holes are in at least partial alignment with the holes of the pressure plate and with the openings or holes (if any) in the second flywheel so that a tool can be caused to engage and rotate the heads of fasteners in order to drive the fasteners into or to withdraw the from the output element. Each hole of the first flywheel can register with a hole in the clutch plate. The dimensions of holes in the diaphragm spring are such that the spring prevents the heads of fasteners from passing through its holes. The same preferably applies for the holes in the clutch plate.

The friction clutch preferably defines an internal space which is configured and dimensioned in such a way that the heads of the fasteners can be accommodated therein while the shanks of such fasteners extend into but not beyond the openings or holes in the substantially disc-shaped portion of the first flywheel. This contributes to convenience of attachment of the preassembled unit (including the two flywheels, the friction clutch, the at least one damper and the at least one bearing) to the output element of the engine.

One of the flywheels (particularly the first flywheel) can carry a pilot bearing for the input element of the transmission.

The friction clutch can be separably coupled to the second flywheel.

The cover of the friction clutch can include an axially extending radially outer portion which is adjacent the annular chamber, and the chamber can extend radially of the cover and can surround the radially outer portion of the cover.

The aforementioned stressing portions for the energy storing elements of the at least one damper can be provided on the axially extending radially outer portion of the cover; such stressing portions can be disposed substantially radially of the axially extending radially outer portion.

The stressing portions can include or constitute discrete lugs which are affixed to the cover. If the cover includes an axially extending radially outer portion which has a free end at the first flywheel, the stressing portions can be provided at the exterior of the axially extending portion and can be spaced apart from the free end.

The energy storing elements of the at least one damper can be radially outwardly adjacent the axially extending portion of the cover.

The aforementioned wall (which bounds a portion of the annular chamber) can surround portions of the energy storing elements and can be made of the same material as the cover of the friction clutch. The normally flange-like carrier of friction linings forming part of the clutch plate can also be made of a material which is the same as that of the wall and/or the cover. In order to reduce the cost of the improved apparatus, the cover of the friction clutch, the carrier of the clutch plate and the wall can constitute separated sections of an originally one-piece blank.

The connection between the cover of the friction clutch and the second flywheel can be a permanent connection, e.g., a connection consisting of or including one or more welded seams or spot welds.

A thermal insulator can be installed between the second flywheel and the annular chamber and/or between the second flywheel and the stressing portions for the energy storing elements of the at least one damper and/or between the cover and the second flywheel.

If the cover of the friction clutch has an axially extending portion which surrounds the second flywheel, the connection between the cover and the second flywheel can comprise at least one projection which extends into a radial recess of the second flywheel. The recess can be a substantially cruciform recess which is obtained by providing the peripheral surface of the second flywheel with at least one circumferentially extending groove and with at least one axially parallel groove which intersects the circumferentially extending groove. The projection of the axially extending portion of the cover of the friction clutch is substantially complementary to and extends into the cruciform or substantially cruciform recess which is formed at the intersection of the circumferentially extending and axially parallel grooves. The two grooves can cross each other at an angle of substantially or exactly 90°. The second flywheel can be provided with a concave surface which bounds the axially parallel groove. The projection of the axially extending portion of the cover can constitute an integral part of the axially extending portion which is stamped to flow into the intersection of the circumferentially extending and axially parallel grooves.

Another feature of the invention resides in the provision of a torque transmitting apparatus which comprises a first flywheel connectable with the engine of a motor vehicle, a second flywheel connectable with a transmission of the vehicle by a friction clutch having a cover which is connected to the second flywheel, at least one damper which is operative to oppose rotation of the flywheels relative to each other and is disposed at least in part in an annular chamber defined at least in part by the first flywheel, a wall or another suitable component defining another part of the chamber, a supply of viscous fluid which at least partially fills the chamber, and means for at least substantially sealing the chamber from the atmosphere. The sealing means comprises a sealing element which is interposed between the external surface of the cover and the aforementioned component.

A further feature of the invention resides in the provision of a torque transmitting apparatus which comprises a first rotary flywheel connectable to the engine of a motor vehicle, a second rotary flywheel which is coaxial with the first flywheel and is connectable to a transmission of the vehicle by a friction clutch having a cover, a pressure plate on the cover, and a clutch plate between the pressure plate and a friction surface of the second flywheel, at least one damper which is operative to oppose rotation of the flywheels relative to each other and is disposed in an annular chamber defined at least in part by the first flywheel, a supply of viscous fluid which at least partially fills the chamber, and means for at least substantially sealing the chamber from the atmosphere. The chamber has a radially inner portion which extends radially inwardly from the outermost portion of the friction surface toward but short of the radially innermost portion of the friction surface. It is presently preferred that the radially inner portion of the annular chamber terminate at most midway between the radially innermost and outermost portions of the friction surface.

An additional feature of the invention resides in the provision of a torque transmitting apparatus which comprises a first rotary flywheel connectable with the engine of a motor vehicle, a second rotary flywheel which is connectable with the transmission of the vehicle, and at least one damper which is operative to oppose rotation of the two flywheels relative to each other and is disposed in a sealed annular chamber defined at least in part by one of the flywheels. The flywheels have portions which define a narrow clearance and confront each other radially inwardly of the annular chamber.

Still another feature of the invention resides in the provision of a torque transmitting apparatus which comprises a first rotary flywheel having a substantially radially extending disc-shaped portion connectable with the engine of a motor vehicle, a second rotary flywheel which is connectable with the transmission of the vehicle by a friction clutch, and at least one damper which is operative to oppose rotation of the flywheels relative to each other and is disposed in an annular chamber defined in part by an axially extending portion which is rigid with the disc-shaped portion of the first flywheel. The chamber has a radially outermost portion which is surrounded by the axially extending portion, and the apparatus further comprises an annular wall which is adjacent the axially extending portion and bounds a portion of the annular chamber. The second flywheel has an annular friction surface adjacent a clutch plate of the friction clutch, and the wall is disposed radially outwardly of the friction surface.

A further feature of the invention resides in the provision of a torque transmitting apparatus which comprises a first rotary flywheel connectable with the engine of a vehicle, a second rotary flywheel which is connectable with a transmission of the vehicle by a friction clutch having a pressure plate and a clutch plate between the pressure plate and an annular friction surface of the second flywheel, at least one antifriction bearing between the two flywheels, and at least one damper operative to oppose rotation of the flywheels relative to each other and disposed in an annular chamber which is at least partially filled with a viscous fluid and is defined at least in part by one of the flywheels. The at least one damper has coil springs and/or other suitable energy storing elements which are installed in a toroidal portion of the chamber, and the apparatus further comprises means for at least substantially sealing the chamber from the atmosphere. The sealing means comprises a sealing element between a first component which is rotatable with the first flywheel and a second component which is rotatable with the second flywheel. The one flywheel has a surface bounding the toroidal portion of the chamber and closely following the outlines of adjacent portions of energy storing elements in the toroidal portion. The sealing element and the toroidal portion of the chamber are located radially outwardly of the second flywheel. The two flywheels include neighboring portions which extend substantially radially inwardly from the toroidal portion of the chamber and define a preferably narrow clearance.

Another feature of the invention resides in the provision of a torque transmitting apparatus which comprises a first rotary flywheel, a second rotary flywheel which is connectable with the transmission of a motor vehicle by a friction clutch, at least one antifriction bearing between the flywheels, and at least one damper which is operative to oppose rotation of the flywheels relative to each other and is disposed in a liquid-containing annular chamber of one of the flywheels. The first flywheel has a plurality of holes which are surrounded by the at least one bearing, and the apparatus further comprises means for fastening the first flywheel to a rotary output element of the engine of the motor vehicle. The fastening means comprises discrete fasteners which extend into the holes of the first flywheel.

An additional feature of the invention resides in the provision of a torque transmitting apparatus which comprises a first rotary flywheel, a second rotary flywheel which is connectable with the transmission of a motor vehicle, at least one damper which is operative to oppose rotation of the flywheels relative to each other, at least one antifriction bearing between the flywheels, and means for fastening the first flywheel to a rotary output element of the engine of the motor vehicle. The fastening means includes fasteners which are disposed radially outwardly of the at least one bearing.

Still another feature of the invention resides in the provision of a torque transmitting apparatus which comprises a first rotary flywheel, a second rotary flywheel which is connectable with the transmission of a motor vehicle, and at least one antifriction bearing between the flywheels. The flywheels define a passage which is surrounded by the at least one bearing, and the apparatus further comprises means for fastening the first flywheel to a rotary output element of the engine in the motor vehicle. The fastening means comprises fasteners which are insertable into holes provided therefor in the first flywheel radially outwardly of the at least one bearing. One side of the first flywheel confronts the second flywheel and the fasteners are insertable into the respective holes from the one side of the first flywheel. The second flywheel has openings in at least partial alignment with the holes of the first flywheel.

A further feature of the invention resides in the provision of a torque transmitting apparatus which comprises a first rotary flywheel connectable with the engine of a motor vehicle, a second rotary flywheel which is connectable with the transmission of the vehicle by a friction clutch having a cover, and at least one damper which is operative to oppose rotation of the flywheels relative to each other and is disposed in an annular chamber defined at least in part by one of the flywheels and disposed radially outwardly of the cover.

Another feature of the invention resides in the provision of a torque transmitting apparatus which comprises a first rotary flywheel connectable to the engine of a motor vehicle, a second rotary flywheel which is connectable to the transmission of the vehicle by a friction clutch having a cover, and at least one damper which is operative to oppose rotation of the flywheels relative to each other and is disposed in an annular fluid-containing chamber defined in part by the first flywheel and in part by an annular wall which is secured to the first flywheel, which extends substantially radially inwardly, and which closely follows the outlines of energy storing elements forming part of the at least one damper and confined in the chamber. The wall and the cover consist of the same material.

A further feature of the invention resides in the provision of a torque transmitting apparatus comprising a first rotary flywheel which is connectable with the engine of a motor vehicle, a second rotary flywheel which is connectable with the transmission of the vehicle by a friction clutch having a cover, at least one damper which is operative to oppose rotation of the flywheels relative to each other, and at least one welded joint between the cover and the second flywheel.

An additional feature of the invention resides in the provision of a torque transmitting apparatus which comprises a first rotary flywheel connectable with the engine of a motor vehicle, a second rotary flywheel connectable with the transmission of the vehicle by a friction clutch, at least one damper which is operative to oppose rotation of the flywheels relative to each other and is disposed in an annular chamber defined at least in part by one of the flywheels, and at least one thermal barrier between the second flywheel and the chamber.

Another feature of the invention resides in the provision of a torque transmitting apparatus which comprises a first rotary flywheel connectable with the engine of a motor vehicle, a second rotary flywheel which is connectable with the transmission of the vehicle, at least one damper which is operative to oppose rotation of the flywheels relative to each other and includes a plurality of energy storing elements on the first flywheel, stressing portions which are rotatable with the second flywheel and engage the energy storing elements, and at least one thermal barrier which is interposed between the second flywheel and the stressing portions.

A further feature of the invention resides in the provision of a torque transmitting apparatus which comprises a first rotary flywheel connectable to the engine of a motor vehicle, a second rotary flywheel connectable with the transmission of the vehicle by a friction clutch having a cover with an axially extending portion which surrounds the second flywheel, at least one projection forming part of the axially extending portion and received in a radial recess of the second flywheel, and at least one damper which is operative to oppose rotation of the flywheels relative to each other.

An additional feature of the invention resides in the provision of a torque transmitting apparatus which comprises a first rotary flywheel connectable with the engine of a motor vehicle, a second rotary flywheel connectable with the transmission of the vehicle by a friction clutch having a cover with an axially extending portion which surrounds the second flywheel, a pressure plate which is axially movably connected with the cover, a clutch plate between the second flywheel and the pressure plate, and at least one spring which reacts against the cover and bears against the pressure plate to urge the clutch plate against the second flywheel, means for connecting the second flywheel to the cover including at least one substantially cruciform recess in the peripheral surface of the second flywheel and a projection provided on the axially extending portion of the cover and extending into the recess, and at least one damper which is operative to oppose rotation of the flywheels relative to each other.

The novel features which are considered as characteristic of the invention are set forth in particular in the appended claims. The improved apparatus itself, however, both as to construction and its mode of operation, together with additional features and advantages thereof, will be best understood upon perusal of the following detailed description of certain presently preferred specific embodiments with reference to the accompanying drawing.

BRIEF DESCRIPTION OF THE DRAWING

FIG. 6 is an enlarged fragmentary sectional view of a detail showing one mode of connecting the cover of the friction clutch to the adjacent flywheel;

FIG. 7 is a view substantially as seen in the direction of arrow VII in FIG. 6;

FIG. 8 is a view similar to that of FIG. 6 but showing a second mode of connecting the cover of the friction clutch to the adjacent flywheel;

DESCRIPTION OF PREFERRED EMBODIMENTS

Figure 1:
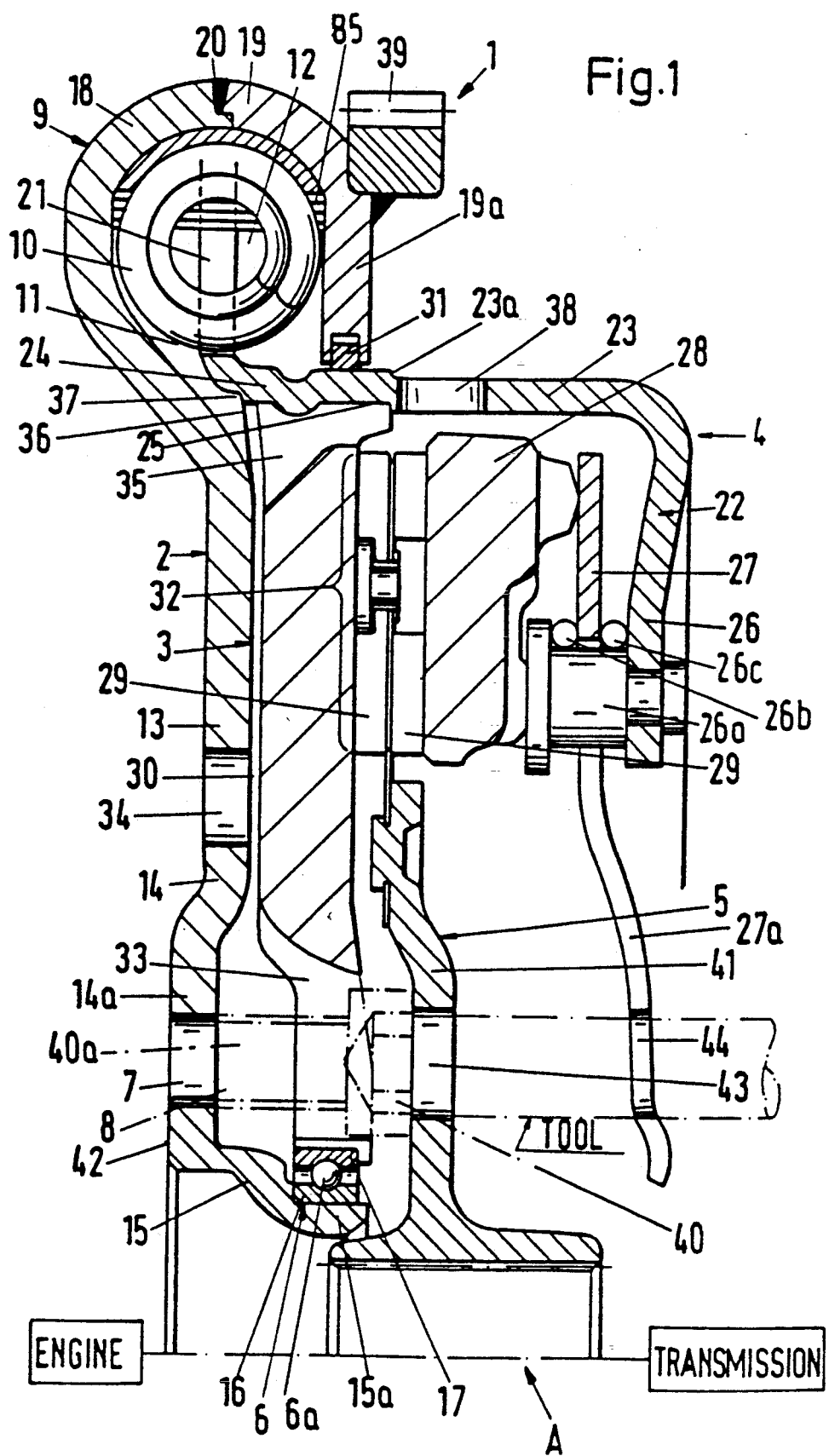
FIG. 1 is a fragmentary axial sectional view of a torque transmitting apparatus which embodies one form of the invention.

FIG. 1 shows a portion of a torque transmitting apparatus 1 having a composite flywheel including a first or primary flywheel 2 and a second or secondary flywheel 3. The flywheel 2 has a substantially disc-shaped radially extending central portion 14 which is connectable to the rotary element of an engine, not shown, for example, to the crankshaft of an internal combustion engine, by fastening means including several rotary fasteners in the form of screw or bolts 8 (hereinafter called screws for short). The second flywheel 3 carries a friction clutch 4 which forms part of a power train and can be engaged to transmit torque between the flywheel 3 and the input shaft of a variable-speed transmission, not shown. Reference may be had, for example, to commonly owned U.S. Pat. No. 4,989,710 granted Feb. 5, 1991 to Wolfgang Reik et al. The input shaft of the transmission receives torque from a clutch plate 5 which is installed between a pressure plate 28 of the clutch 4 and an annular radially extending friction surface 32 of the flywheel 3.

An antifriction roller bearing 6 (here shown as a ball bearing with a single annulus of spherical rolling elements 6a) is installed between the flywheels 2 and 3, and such bearing is disposed radially inwardly of a set of openings in the form of bores or holes 7 which are provided in the disc-shaped portion 14 of the flywheel 2 to receive the externally threaded shanks 40a of the screws 8. The heads 40 of the screws 8 abut the inner (right-hand) side of the disc-shaped portion 14 when the flywheel 2 is properly fastened to the rotary output element of the engine.

The apparatus 1 further comprises one or more dampers which oppose rotation of the flywheels 2 and 3 relative to each other. FIG. 1 shows only one damper 9 which includes a set of arcuate energy storing elements 10 in the form of helical springs acting in the circumferential direction of the flywheels 2, 3 and being installed in the toroidal radially outermost portion 12 of an annular chamber 11 containing a supply 85 of viscous fluid. The fluid which at least partially fills the chamber 11 is oil or grease and serves to lubricate the energy storing elements 10 as well as several stressing portions or arms 21 forming integral parts of the cover or housing 22 of the friction clutch 4 and alternating with the energy storing elements 10.

The first flywheel 2 is a suitably shaped and converted blank 13 of metallic sheet material which, in addition to the substantially radially extending disc-shaped portion 14, includes an axially extending toroidal portion 18 integral with the portion 14 and surrounding the radially outermost portion 12 of the chamber 11, and an axially extending annular protuberance 15 which is integral with the radially innermost part of the disc-shaped portion 14 and is located radially inwardly of the holes 7.

The inner race 16 of the bearing 6 surrounds the free end portion or rear end portion 15a of the protuberance 15 of the flywheel 2, and the outer race 17 of this bearing centers and supports the radially innermost portion of the flywheel 3 radially inwardly of the friction surface 32. The flywheel 3 is essentially a flat disc-shaped casting having an axially extending central passage for the outer race 17 of the bearing 6.

The axially extending portion 18 of the flywheel 2 has a substantially C-shaped cross-sectional outline and has an internal surface which closely follows the outlines of adjacent portions of the energy storing elements 10. This is particularly important and advantageous in the regions of radially outermost portions of the circumferentially extending energy storing elements 10 because each such element can be supported and guided by the adjacent surface of the axially extending portion 18 when the apparatus 1 is in actual use and the elements 10 tend to move radially outwardly under the action of centrifugal force. The portion 18 extends in part forwardly (to the left and hence toward the engine) and in part rearwardly (to the right) of the plane of the radially extending portion 14. This portion 18 is located radially outwardly of the toroidal outer portion 12 of the annular chamber 11 to thus at least partially surround the energy storing elements 10.

The right-hand end or rear end of the axially extending portion 18 is adjacent the radially outermost portion of a component or wall 19 which defines a portion of the chamber 11 and its toroidal portion 12 and cooperates with the portion 18 to properly guide and support at least the radially outer portions of the elements 10. The wall 19 can be made of metallic sheet material, the same as the blank or main portion 13 of the flywheel 2. In the apparatus of FIG. 1, the portion 18 and the wall 19 are in part mirror images of each other and each thereof defines approximately or exactly one-half of the toroidal radially outermost portion 12 of the annular space 11. The wall 19 is welded to the portion 18, as at 20. The radially inwardly extending portion 19a of the wall 19 is adjacent the external surface of an axially extending outer portion 23 of the cover 22 and supports a ring-shaped sealing element 31 which engages the external surface 23a of the portion 23 and constitutes one part of the means for at least substantially sealing the annular chamber 11 and its radially outermost portion 12 from the surrounding atmosphere. The welded joint 20 can constitute a circumferentially complete ring to prevent escape of confined viscous fluid between the axially extending portion 18 of the flywheel 2 and the wall 19.

The toroidal portion 12 of the chamber 11 is divided into several compartments, one for each of the energy storing elements 10. Such compartments extend in the circumferential direction of the flywheel 2 and alternate with abutments acting as retainers for the adjacent elements 10. The elements 10 are deformed in response to rotation of the flywheel 2 relative to the flywheel 3, or vice versa, by the stressing portions or arms 21 which extend radially of the common axis of the flywheels 2, 3 and into the chamber 11 so as to alternate with the elements 10. Reference may be had, for example, to FIG. 2 of commonly owned U.S. Pat. No. 4,946,420 granted Aug. 7, 1990 to Johann Jäckel. The portion 18 and/or the wall 19 is provided with internal partitions which separate the compartments of the toroidal portion 12 from each other and act as retainers for the respective energy storing elements 10. Each compartment can be said to constitute a pocket for the respective element 10, and the elements 10 are stressed by the arms 21 when at least one of the flywheels 2, 3 changes its angular position relative to the other flywheel. The stressing arms 21 are provided on the cover 22 of the friction clutch 4, and more particularly on the portion 23 of the cover. The stressing arms 21 which are shown in FIG. 1 are radially outwardly extending fingers which are integral with the axially extending portion 23 of the cover 22 and extend into the toroidal portion 12 of the annular chamber 11 in the general plane of the disc-shaped portion 14 of the flywheel 2. As mentioned above, the stressing arms 21 engage the adjacent energy storing elements 10 in the toroidal portion 12 of the chamber 11 and cause such elements to store energy when the flywheel 2 and/or 3 leaves its neutral or starting angular position relative to the other flywheel.

The axially extending portion 23 of the cover 22 is adjacent and surrounds the peripheral surface of the flywheel 3 and is non-rotatably and rigidly connected thereto by a set of projections or lobes 24 provided on the portion 23 and extending into complementary notches or recesses in the peripheral surface of the flywheel 3. In order to facilitate proper axial positioning of the flywheel 3 and friction clutch 4 relative to each other, the internal surface of the axially extending portion 23 is provided with a circumferentially extending shoulder 25 for the adjacent radially outermost portion of the flywheel 3. The projections 24 are formed at a time when the flywheel 3 already abuts the shoulder 25.

The cover 22 of the friction clutch 4 is accurately centered when its axially extending portion 23 engages the peripheral surface of the flywheel 3 and the latter abuts the internal shoulder 25 of the portion 23. The portion 23 is integral with the radially outermost part of a substantially radially extending portion 26 of the cover 22, and the portion 26 carries rivets 26, a for two ring-shaped seats 26b, 26c flanking the circumferentially complete annular portion of a diaphragm spring 27 having radially inwardly extending prongs 27a. The diaphragm spring 27 acts not unlike a two-armed lever and its annular outer portion normally bears against the adjacent projections of the axially movable pressure plate 28 which is non-rotatably connected to but is movable axially of the cover 22. The pressure plate 28 is adjacent one of two friction linings 29 on the flange-like carrier 41 of the clutch plate 5. The latter further comprises a hub which is integral with the radially innermost portion of the carrier 41 and can be non-rotatably slipped onto the input shaft of a variable-speed transmission. The hub for the carrier 41 is partially surrounded by the free end portion 15a of the protuberance 15 and extends into the central axial passage which is defined by the flywheel 2. The other friction lining 29 on the carrier 41 of the clutch plate 5 is adjacent the friction surface 32 of the flywheel 3. When the friction clutch 4 transmits torque between the flywheel 3 and the variable-speed transmission of the vehicle, the friction linings 29 of the clutch plate 5 are clamped between the friction surface 32 of the flywheel 3 and the adjacent surface of the pressure plate 28 which is biased by the diaphragm spring 27. In order to disengage the clutch 4, the prongs 27a of the diaphragm spring are moved to the left so that the radially outermost portion of the diaphragm spring 27 relaxes the bias upon the pressure plate 28 and the latter is pulled to the right by leaf springs or the like (not shown) on the cover portion 23 or 26 to relax the pressure upon the adjacent friction lining 29. This enables the flywheel 3 to rotate independently of the clutch plate 5 and vice versa.

FIG. 1 shows that by far the major part of the annular chamber 11 (including the entire toroidal portion 12) is located radially outwardly of the second flywheel 3. This renders it possible to mount the flywheel 3 in immediate or close proximity to the disc-shaped portion 10 so that the flywheels 2, 3 define a substantially radially extending narrow clearance or gap 30, and such clearance extends practically all the way from the protuberance 15 to the portion 23 of the cover 22. At least a substantial part of the flywheel 3 is actually surrounded by the chamber 11, and the entire flywheel 3 is located radially inwardly of such chamber. This renders it possible to significantly enhance the compactness of the improved torque transmitting apparatus, particularly in the axial direction of the flywheels 2 and 3. Such torque transmitting apparatus can be utilized with advantage in all types of motor vehicles including those wherein the engine-transmission assembly extends in the direction of movement of the vehicle as well as in vehicles wherein the engine-transmission assembly extends transversely of such direction.

As can be seen in FIG. 1, the combined axial length of the flywheels 2, 3, bearing 6, damper 9 and friction clutch 4 is a small fraction of the diameter of the flywheel 2. This is of considerable importance in many motor vehicles which provide space for a larger-diameter flywheel-clutch unit but little room in the axial direction of such unit. The entire second flywheel 3 is closely or immediately adjacent the converted blank 13 of the flywheel 2. In fact, if the wall 19 is considered an integral part of the flywheel 2, this flywheel confines the outer flywheel 3 so that only the friction clutch 4 projects axially beyond the primary flywheel. The flywheel 3 need not even participate in sealing of the chamber 11 from the atmosphere. The aforementioned sealing means for the chamber 11 includes the sealing element 31 which surrounds the axially extending portion 23 of the cover 22, and a ring-shaped seal 36 which operates between the flywheel 2 (at the junction of the disc-shaped portion 14 and axially extending portion 18) and an internal shoulder 37 of the axially extending portion 23 of the cover 22 adjacent the projections 24. The improved apparatus is designed in such a way that none of the component parts of the friction clutch 4 and/or any other parts extend between the flywheel 3 and the adjacent portion of the flywheel 2.

It is presently preferred to design and mount the flywheels 2 and 3 in such a way that the width of 50% or more of the clearance 30 (as seen in the axial direction of the flywheels 2 and 3) is in the range of 0.5 to 4 mm. Highly satisfactory results were obtained with a torque transmitting apparatus wherein the width of the clearance is between 1 and 2 mm. The clearance 30 can be used to establish a portion of a path for the flow of a cooling medium, such as air, which prevents the transfer of heat from the friction surface 32 of the flywheel 3 to the flywheel 2. Actually, the stream or streams of air flowing through the clearance 30 cool the entire apparatus including the flywheels 2 and 3, the bearing or bearings 6, the parts which define the chamber 11, and the friction clutch 4. The radially inner portion of the flywheel 3 has one or more openings or holes 33 which constitute inlets for admission of cool atmospheric air into the clearance 30, and the radially outer portion of the flywheel 3 has one or more opening or holes 35 which act not unlike an outlet for the air stream or air streams flowing radially outwardly along the inner side of the disc-shaped portion 14. The latter can be provided with one or more openings 34 which are disposed radially outwardly of the opening 33 and can discharge some air in a direction toward the engine. The openings 33, 34 are located radially inwardly, and the openings 35 are located radially outwardly of the friction surface 32 on the flywheel 3. The circulation of air, and hence the cooling action of such air, can be improved still further by providing one or more openings or ports 38 in the axially extending portion 23 of the cover 22. Jets of cooling air which are admitted into the clearance 30 by the openings 33 of the flywheel 3 impinge directly against the radially inner part of the disc-shaped portion 14, and such jets remove. heat from the region around the bearing 6.

The openings 33 can be provided in addition to or in lieu of the openings 34, and the openings 33 can serve the additional purpose of permitting introduction of the shanks 40a of screws 8 (each such screw can constitute and allen screw) into the holes 7 of the disc-shaped portion 14. Moreover, the openings 33 enable the working end of a tool (not shown) to reach the heads 40 of the screws 8 and to rotate the screws, either in a direction to drive the shanks 40a home into the tapped bores or holes of the output element of the engine or to separate the flywheel 2 from such output element.

The openings 33, 34, 35 and/or the parts 38 can be round or can resemble slots which preferably extend in the circumferential direction of the flywheels 2 and 3.

The ring-shaped seal 36 in the radially outermost portion of the clearance 30 can include or constitute a diaphragm which seals the clearance 30 from the chamber 11. It is also possible to employ a seal 36 which resembles or constitutes a diaphragm spring. The seal 36 is located, at least in part, radially outwardly of the friction surface 32. This seal can be provided further radially inwardly by preferably not beyond a location halfway between the radially innermost and radially outermost portions of the friction surface 32. Thus, at least the inner half of the friction surface 32 is located radially inwardly of the radially inwardly extending portion of the chamber 11 immediately adjacent the seal 36.

It is presently preferred to secure the radially innermost portion of the seal 36 to the flywheel 2 and to cause the radially outermost portion of this seal to bear against the internal shoulder 37 of the axially extending portion 23 of the cover 22. The shoulder 37 centers the seal 36 in an optimum position to prevent communication between the radially inner portion of the chamber 11 and the radially outermost portion of the clearance 30. The seal 36 is installed in prestressed condition and is shown at the general level of the openings 35 in the radially outermost portion of the flywheel 3.

The sealing element 31 can constitute an O-ring or a solid ring of rubber or other suitable elastomeric material. This ring is recessed into the inner end face of the radially inwardly extending portion 19a of the wall 19 and is in sealing engagement with the external surface 23a of the axially extending portion 23 of the cover 2. If desired, the illustrated sealing element 31 can be replaced with a diaphragm spring, with a membrane or with any other part which can reliably prevent escape of viscous fluid from the annular chamber 11. The placing of sealing means 31, 36 at or radially outwardly of the flywheel 3 ensures that the flywheels 2, 3 can define a large clearance or gap 30 which, in turn, ensures highly satisfactory circulation of large quantities of cooling atmospheric air to prevent overheating of the viscous fluid, of the bearing 6, of the flywheels and/or the engine. Heat is generated primarily at the friction surface 32 of the flywheel 3; therefore, circulation of large quantities of air, with attendant thorough cooling of the flywheel 3, is highly desirable.

It will be noted that the openings 35 in the flywheel 3 are located radially inwardly of the sealing element 31. These openings enable streams of air to flow along the internal surface of the axially extending portion 23, of the cover 22 and to remove heat from the pressure plate 28 and diaphragm spring 27. The ports 38 in the axially extending portion 23 promote the flow of air into and from the clearance 30 and along the internal surface of the portion 23. It is presently preferred to install the seal 36 at the level of openings 35 and of the radially outermost portion of the friction surface 32 (as seen in the radial direction of the flywheels 2, 3 from their common axis toward the annular chamber 11).

The wall 19 further serves as a carrier of a starter gear 39 which is secured to it by a circumferentially complete welded seam or by spot welding.

The flywheels 2, 3 and the friction clutch 4 including the parts 5, 22, 27 and 28 are connected together to form a preassembled unit A which can be easily manipulated in storage, during shipment as well as during attachment to the output element of an engine. In order to assemble the unit A, the flywheel 3 is connected with the clutch 4 in a first step in such a way that the friction linings 29 of the clutch plate 5 are located between the friction surface 32 and the pressure plate 28. The thus obtained subassembly is then properly combined with the flywheel 2 which involves introducing the stressing arms 21 into the chamber 11 between the energy storing elements 10 of the damper 9 prior to application of the wall 19 which is thereupon welded to the axially extending portion 18 of the flywheel 2 to complete the assembly of the unit A. The wall 19 can be slipped onto the axially extending portion 23 of the cover 22 in a direction from the right, as seen in FIG. 1. The energy storing elements 10 are introduced into the toroidal portion 12 of the chamber 11 prior to welding of the wall 19 to the flywheel 2, as at 20. The sealing element 31 is inserted into the recess of the radially extending portion 19a of the wall 19 before the latter is slipped onto the external surface of the axially extending portion 23 of the cover 22, and the seal 36 is affixed to the inner side of the flywheel 2 before the flywheel 3 is moved to the illustrated position in which the two flywheels define the large radially extending clearance or gap 30. The bearing 6 is mounted first on the protuberance 15 of the flywheel 2 or in the axial passage of the flywheel 3.

The screws 8 are inserted into the holes 7 of the flywheel 2 before the latter is assembled with the flywheel 3 and clutch 4. The heads 40 of the screws 8 extend into the openings 33 of the flywheel 3 but the screws cannot be lost of displaced because their shanks 40a are prevented from leaving the respective openings or holes 7 by the clutch plate 5. The carrier 41 of the clutch plate 5 is provided with openings or holes 43 having diameters which are smaller than the diameters of the heads 40. Alternatively, or in addition to such dimensioning of the holes 43 in the carrier 41 of the clutch plate 5, the diameters of the openings or holes 44 in some or all of the prongs 17a are smaller than the diameters of the heads 40 so that the screws 8 are maintained in positions of readiness to be driven into the tapped bores or holes of the output element of the engine by the working end of a suitable tool which is introduced through a hole 44 of one of the prongs 27a, through a hole 43 in the carrier 41 of the clutch plate 5, through an opening 33 and into the polygonal (normally hexagonal) socket in the head 40 of the respective screw 8. The space which is defined for each screw 8 between the inner side of the disc-shaped portion 14 and the left-hand side of the carrier 41 in the assembled unit A suffices to ensure that the tips of shanks 40a of the screws 8 need not extend beyond the left-hand side 42 of the radially innermost part 14a of the portion 14 during installation of the unit A in a motor vehicle prior to actual attachment of the flywheel 2 to the output element of the engine. To this end, the radially innermost part 14a of the disc-shaped portion 14 can bulge outwardly and away from the adjacent portion of the flywheel 3.

Yieldable elastic rings, sleeves, tongues or like parts can be provided between the outer side 42 of the disc-shaped portion 14 and the carrier 41 to accurately locate the screws 8 for convenient rotation by a tool in order to drive the shanks 40a into the tapped bores or holes of the output element of the engine during installation of the torque transmitting apparatus 1 in a motor vehicle. The yieldable parts undergo deformation and/or are pushed aside while the screws 8 are being driven home by a suitable tool. For example, the yieldable elastic orienting and retaining means for the screws 8 can include rubber sleeves which are introduced into the holes 7 to receive and surround the shanks 40a of the respective screws 8. Such sleeves are expelled from the holes 7 or simply yield when the screws begin to move axially in order to penetrate into the aligned tapped bores of the output element of the engine. The sleeves in the holes 7 hold the shanks 40a in such positions that they normally do not extend outwardly beyond the left-hand side 42 of disc-shaped portion 14 of the flywheel 2. This simplifies proper positioning of the unit A for attachment to the engine. If desired, the elastic sleeves can be slipped onto the shanks 40a prior to introduction of the tips of such shanks into the respective holes 7.

The clutch plate 5 of the preassembled unit A is centered by the flywheel 3 and pressure plate 28 in such position that its axis coincides with the axis of the output element of the engine when the flywheel 2 is connected to the engine. The angular position of the clutch plate 5 in the unit A is selected in such a way that each opening 33 of the flywheel 3 is in at least partial alignment with a hole 43 of the carrier 41. The extent of alignment of holes 43 with the openings 33 should be sufficient to permit convenient introduction of a wrench or any other suitable tool which is used to drive the screws 8 home.

The diaphragm spring 27 is mounted in the cover 22 of the friction clutch 4 in such a way that each opening 33 of the flywheel 3 is in partial or full alignment with one of the holes 44. Thus, the torque transmitting tool can be introduced first through a hole 44, thereupon through a hole 43 and thereupon into the socket of the respective head 40 in order to transmit torque in a direction such that the screw 8 is secured in the output element of the engine. The holes 44 in the prongs 27a of the diaphragm spring 27 can constitute circular holes which are completely surrounded by the material of the respective prongs 27a, or lateral recesses or notches or cutouts in the respective prongs. Reference may be had to commonly owned U.S. Pat. No. 4,747,586 granted May 31, 1988 to Wolfgang Reik. All that counts is to ensure that a torque transmitting tool can be moved into proper engagement with the heads 40 of the screws 8, either for the purpose of affixing the unit A to an engine or for the purpose of disconnecting such unit from the engine. For example, the holes 44 can constitute enlarged portions of slots which alternate with the prongs 27a of the diaphragm spring 27.

Care should be taken to ensure that, when the unit A is assembled, each hole 7 is in proper or adequate alignment with an opening 33, with a hole 43, and with a hole 44 even if the holes 7 are not equidistant from each other. Such unequal distribution of holes 7 in the innermost part 14a of the disc-shaped portion 14 in the region outwardly adjacent the protuberance 15 is often desirable and advantageous when it is necessary to ensure that the flywheel 2 can be affixed to the output element of the engine in a single predetermined angular position. Reference may be had, for analogy, to commonly owned U.S. Pat. No. 4,493,409 granted Jan. 15, 1985 to Klaus Steeg.

The holes or slots or recesses 44 are smaller than necessary to permit the passage of the heads 40.

The assembly of improved apparatus 1 into a unit A which is ready to be affixed to an engine and to a transmission facilitates the task of installing the apparatus in a motor vehicle and brings about substantial savings in time. For example, it is much simpler (a) to properly center all component parts (particularly the clutch plate 5) prior to attachment to an engine, (b) to install the clutch plate 5 between the cover 22 of the friction clutch 4 and the flywheel 3, (c) to attach the friction clutch 4 to the flywheel 3, (d) to introduce the customary centering mandrel, (e) to center the clutch plate 5 on the mandrel, (f) to insert the screws 40, (g) to actually attach the flywheel 2 to the output element of the engine, and (h) to withdraw the centering mandrel.

An important advantage of the improved apparatus is that it can dispense with the flange (note the flange 32 in FIG. 1 of the aforementioned commonly owned U.S. Pat. No. 4,989,710) which is a standard part of presently known torque transmitting apparatus, which serves to transmit torque from the energy storing elements of the damper or dampers to the secondary flywheel, and which is disposed between the primary and secondary flywheels. Consequently, the two flywheels can be moved into immediate or very close proximity to each other to thus contribute to a reduction of the axial dimensions of the improved apparatus. The function of the conventional flange is taken over by the stressing arms 21 which are preferably (but need not be) integral parts of the cover 22. Thus, the primary flywheel 2 transmits torque to the secondary flywheel 3 by way of the damper 9, stressing arms 21 and cover 22 of the friction clutch 4.

If the stressing arms 21 are not integral with the cover of the friction clutch (FIG. 2), the two flywheels can be fully assembled with one another before the secondary flywheel is connected with the cover of the friction clutch. Such design of the improved apparatus exhibits the additional advantage that the clutch can employ a standard cover which is separably connected with the carrier of stressing arms or with discrete stressing arms.

The flywheels 2 and 3 can be positioned in immediate or close proximity to each other because the annular chamber 11 is moved radially outwardly beyond the peripheral surface of the secondary flywheel. As mentioned above, the seal 36 can be located radially outwardly of the friction surface 32 of the secondary flywheel 3 and is preferably mounted in such a way that it does not extend radially inwardly beyond a position substantially halfway between the radially innermost and outermost portions of the friction surface 32. In other words, the radially innermost portion of the chamber 11 should not be located nearer to the radially innermost portion than to the radially outermost portion of the friction surface 32.

The disc-shaped portion 14 of the primary flywheel 2 is or can be immediately adjacent the output element (e.g., a crankshaft) of the engine which is to rotate the flywheel 2. Such mounting of the flywheel 2 also contributes to a reduction of space requirements of the apparatus as seen in the axial direction of the output element of the engine.

In the apparatus of FIG. 1, the disc-shaped portion 14 of the primary flywheel 2 extends radially outwardly all the way to the radially outermost portion of the friction surface 32 on the secondary flywheel 3. This is desirable and advantageous because the secondary flywheel need not extend radially outwardly beyond the disc-shaped portion and at least the major part of the secondary flywheel can be placed into close or immediate proximity to the primary flywheel. The arrangement is preferably such that the disc-shaped portion 14 extends radially outwardly to a position at least midway between the radially innermost and radially outermost portions of the friction surface 32.

When the wall 19 is welded to the axially extending portion 18 of the primary flywheel 2, the latter can be said to resemble a rather shallow receptacle which fully or nearly fully accommodates the secondary flywheel 3. The latter is located radially inwardly of the annular chamber 11 and is aligned with the chamber in the axial direction of the two flywheels.

The positioning of the bearing 6 in the general plane of the secondary flywheel 3 also contributes to compactness of the apparatus 1. The right-hand end faces of the races 16, 17 are located in or close to the plane of the friction surface 32. In other words, the secondary flywheel does not extend, or need not appreciably extend, beyond the friction surface 32 (as seen in a direction away from and axially of the primary flywheel 2).

The radially innermost portion 19a of the wall 19 is located radially outwardly of the peripheral surface of the secondary flywheel 3 and radially outwardly of the axially extending portion 23 of the cover 22. This is desirable and advantageous for the aforediscussed reasons, i.e., the secondary flywheel 3 can be introduced into the axially extending portion 23 and the latter can be introduced into the space within the portion 19a so that the flywheel 3 can be moved into immediate or close proximity to the disc-shaped portion 14 of the flywheel 2 and can be at least partially surrounded by the chamber 11.

It is presently preferred to design and assemble the flywheels 2 and 3 in such a way that the disc-shaped portion 14 overlies at least the inner half of the flywheel 3 (as seen from the common axis of the flywheels toward the chamber 11). Thus, the clearance 30 preferably extends radially outwardly from the radially innermost portion of the secondary flywheel and to a location at least substantially midway between the radially innermost and outermost portions of the friction surface 32. This requirement is more than met in the apparatus of FIG. 1 since the clearance 30 extends radially outwardly all the way to or at least in close proximity of the radially outermost portion of the friction surface 32.

The ring-shaped starter gear 39 can constitute an integral part of the wall 19. This contributes to lower cost of the apparatus because the gear 39 need not be welded or otherwise non-rotatably secured to the wall 19. The illustrated gear 39 is substantially coplanar with the clutch plate 5, i.e., the friction linings 29 are spaced apart from the disc-shaped portion 14 of the primary flywheel 2 a distance which equals or approximates the distance of the gear 39 from the plane of the portion 14. The illustrated gear 39 is spaced apart from the axially extending portion 23 of the cover 22 as seen in the radial direction of the apparatus. This gear is located at the level of that (substantially axially extending) portion of the wall 19 which surrounds approximately one-half of the toroidal portion 12 of the annular chamber 11.

As can be seen in FIG. 1, the stressing arms 21 can extend radially outwardly and substantially diametrically of the adjacent energy storing elements 10 from locations substantially radially inwardly of the arms 21 and radially outwardly to locations at or close to the radially outermost portions of the arms. In other words, that portion of each arm 21 which engages the adjacent energy storing element 10 can have a length which at least approximates the diameter of an energy storing element. As mentioned above, and as will be described in greater detail with reference to FIG. 3, the stressing arms cooperate with retainers which are mounted on, or form part of, the primary flywheel so that the energy storing elements 10 are stressed by being compressed between the respective arms 21 and the corresponding retainers of or on the flywheel 2 when at least one of the flywheels is caused to turn relative to the other flywheel.

The provision of holes 7 radially outwardly of the bearing 6 is preferred in many instances. However, and as will be described with reference to FIG. 5, the holes for the screws which fasten the primary flywheel to the engine can be provided at a level such that one of the races of the bearing must be formed with holes in register with holes in the primary flywheel. It is equally possible to provide holes for screws 8 radially inwardly of the bearing 6 or to provide some holes radially inwardly and some holes radially outwardly of the bearing. An advantage of positioning the bearing radially inwardly of the holes 7 is that the apparatus can employ a smaller and less expensive bearing.

The openings 33 in the secondary flywheel 3 are or can be sufficiently large to permit passage of the heads 40. This is desirable and advantageous if the screws 8 are to be introduced into the holes 7 subsequent to assembly of the flywheel 2 with the flywheel 3.

If the mutual spacing of neighboring holes 7 in the disc-shaped portion 14 of the primary flywheel 2 is only slightly non-uniform (such as is sufficient to ensure that the flywheel 2 can be affixed to the output element of the engine in a single predetermined angular position in which each hole 7 is in accurate register with a discrete tapped bore in the output element), the mutual spacing of the openings 33 and/or holes 43 and/or holes 44 can be uniform. All that counts is to ensure that, when the unit A is assembled and is ready to be affixed to the output element of an engine, the holes 44, 43 and the openings 33 are in adequate alignment with the heads 40 of the respective screws 8 so that the heads can be engaged by the working end of a rotary tool which is used to drive the shanks 40a into the tapped bores of the output element. If the mutual spacing of the holes 7 is not entirely uniform (as seen in the circumferential direction of the bearing 6) and the mutual spacing of the openings 33 and/or holes 43 and/or holes 44 is uniform, the diameters of the openings 33 and/or holes 43 and/or holes 44 must be larger than the diameter of that portion of the tool which is to be introduced through the holes 44, 43 and openings 33 in order to reach the heads 40 of the screws 8 which are confined in the space between the disc-shaped portion 14 and the carrier or flange 41 of the clutch plate 5. Nevertheless, the diameters of the holes 43 and/or 44 should be smaller than the diameters of the heads 40 so that the fasteners cannot escape from the aforementioned space even if the unit A lies flat so that the radially extending portion 26 of the cover 22 constitutes the lowermost part of the unit. The holes 44 can be relatively large if the holes 43 are sufficiently small to prevent passage of the heads 40. Inversely, the holes 43 can be relatively large if the holes 44 are too small to prevent the passage of heads 40.

Assembly of the flywheels 2, 3, bearing 6, damper 9 and friction clutch 4 into a unit A which is ready to be stored, transported or mounted does not present problems when the properly installed apparatus 1 must be partially dismantled for inspection and/or for other reasons, for example, to replace worn or damaged friction linings 29 (together with the clutch plate 5), especially if the apparatus is assembled in a manner to be described with reference to FIG. 2, namely when the friction clutch comprises a cover (e.g., a standard cover) which is not directly connected to the secondary flywheel. In the modified apparatus of FIG. 2, the axially extending portion of the clutch cover does not contact the viscous fluid in the annular chamber for the damper or dampers. In the apparatus of FIG. 1, the axially extending portion 23 of the cover 22 bounds the radially inner portion of the chamber 11 and cooperates with the seal 36 to establish a liquid-impermeable barrier between the radially inner portion of the chamber 11 and the adjacent outermost portion of the clearance 30.

Figure 2:
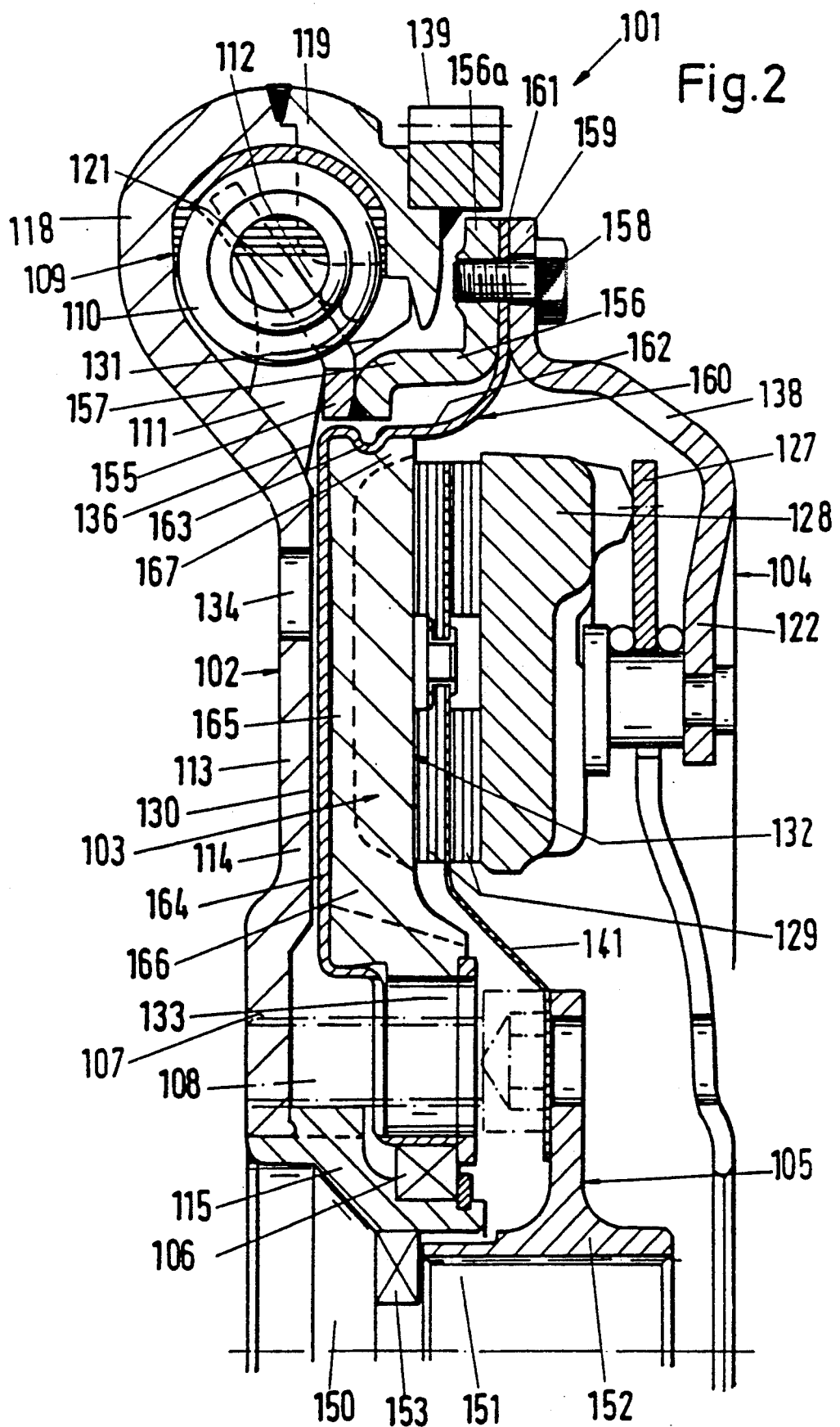
FIG. 2 is a similar fragmentary axial sectional view of a second torque transmitting apparatus.

The torque transmitting apparatus 101 of FIG. 2 differs from the apparatus 1 mainly in the design of the cover 122 of the friction clutch 104, in the design of the clutch plate 105, and in the manner of mounting the stressing arms 121 on the cover 122. All such parts of the apparatus 101 which are identical with or clearly analogous to corresponding parts of the apparatus 1 are denoted by similar reference characters plus 100.

The first or primary flywheel 102 of the torque transmitting apparatus 101 is practically identical with the flywheel 2 except that the openings or holes 134 are more distant from the common axis of the flywheels 102, 103 and are located opposite the radially outer half of friction surface 132 of the flywheel 103. The antifriction ball, roller or needle bearing 106 surrounds the axial protuberance 115 on the flywheel 102 and supports the flywheel 103 radially inwardly of the openings or holes 133 for the screws 108. The hub 152 of the clutch plate 105 has a front end portion 151 which extends into the interior of the protuberance 115. The hub 152 is internally splined so that it can be non-rotatably slipped onto the input shaft of a variable-speed transmission (not shown) in such a way that a portion of the input shaft extends into a pilot bearing 153 within the annular protuberance 115. The flange or carrier 141 of the clutch plate 105 includes a conical intermediate portion so that the friction linings 129 are axially offset relative to the radially innermost portion of the carrier 141. The friction linings 129 are installed between the friction surface 132 of the flywheel 103 and the axially movable pressure plate 128 which is non-rotatably but axially movably mounted on the cover 122. The pressure plate 128 can be biased against the adjacent friction lining 129 of the clutch plate 105 by a diaphragm spring 127 which is mounted on the radially extending portion of the cover 122 in the same way as described in connection with the diaphragm spring 27 of FIG. 1.

The main portion 113 of the flywheel 102 includes the disc-shaped portion 114 which carries the protuberance 115 and has holes or bores 107 for the shanks of the screws 108 as well as the openings 134. The radially outermost part of disc-shaped portion 114 of the main portion 113 is integral with the axially extending portion 118 which is welded to a component 119 (hereinafter called wall) corresponding substantially to the wall 19 and being sealingly engaged by the sealing element 131. The wall 119 carries a ring-shaped starter gear 139 and cooperates with the axially extending portion 118 to surround the toroidal radially outermost portion 112 of the annular chamber 111 for the energy storing elements 110 of the damper 109.

The protuberance 115 is a separately produced part which is welded or otherwise reliably secured to the disc-shaped portion 114 of the flywheel 102. The axial passage 150 of the protuberance 115 accommodates the pilot bearing 153 and the afore-mentioned front end portion 151 of the hub 152, i.e., of the radially innermost portion of the clutch plate 105. The pilot bearing 153 is or can be mounted within the bearing 106 as seen in the axial and radial directions of the protuberance 115.

The pilot bearing 153 can be installed directly in the rotary input element (not shown) of the engine which is to rotate the flywheel 102. The length of the input shaft of the variable-speed transmission of the motor vehicle is then selected in such a way that the input shaft extends to the left through the entire passage 150 and into a socket in the front end face of the output element. The latter then serves as a means for centering the free end portion of the input shaft.

The apparatus 101 of FIG. 2 also comprises means for preventing displacement or loss of screws 108 once the flywheels 102, 103, the bearing 106, the clutch plate 105, the remaining parts of the friction clutch 104, and the damper 109 are assembled into a unit corresponding to the unit A of FIG. 1. Such unit can be readily transported into storage, from storage to the locale of use, at the locale of use and during attachment to the output element of an engine.

The stressing arms 121 for the energy storing elements 110 of the damper 109 extend radially outwardly as well as forwardly from a ring-shaped component 156 (hereinafter called ring) which is affixed to the radially outermost portion 159 of the cover 122 by a set of screws or bolts 158 and/or other suitable fasteners. The ring 156 has a radially innermost portion 157 which is welded to a circumferentially complete annular member 155. The stressing arms 121 are integral with the member 155; they become effective to cause the elements 110 to store additional energy when at least one of the flywheels 102, 103 changes its angular position relative to the other flywheel. The ring 156 has a substantially L-shaped cross-sectional outline and, in addition to the radially innermost portion 157, comprises a radially outwardly extending portion 156a which is adjacent the portion 159 of the cover 122 and is secured thereto by the bolts 159.

The torque transmitting apparatus 101 further comprises a membrane 160 having an outer marginal portion 161 which is sealingly clamped between the portion 156a of the ring 156 and the portion 159 of the cover 122, an intermediate portion 162 which is fixedly secured to the peripheral surface of the flywheel 103, and a radially innermost portion 164 which overlies the left-hand side of the flywheel 103 in the clearance or gap 130 between the two flywheels. The intermediate portion 162 of the membrane 160 has projections 163 which are received in complementary depressions or recesses in the peripheral surface of the flywheel 103. The membrane 160 serves as a means for connecting the cover 122 of the friction clutch 104 to the flywheel 103.

The portions 161, 164 of the membrane 160 extend substantially radially of the flywheels 102, 103, and the intermediate portion 162 extends substantially axially of the friction linings 129 and flywheel 103.

The left-hand side of the flywheel 103 is formed with one or more ventilating and flushing channels 165 which extend (or can extend) substantially radially of the flywheels and are overlapped by the radially innermost portion 164 of the membrane. The channels 165 can constitute grooves which are machined into or are otherwise formed in the left-hand side of the flywheel 103. The latter is further provided with one or more substantially axially extending passages (air admitting inlets) 166 radially inwardly of the friction surface 132 and of the friction linings 129, and with one or more substantially axially extending passages (air discharging outlets) 167 for spent air which has been caused to flow through the respective channel 165. The outlets 167 are located radially outwardly of the friction surface 132 and friction linings 129 and are immediately or closely adjacent the substantially axially extending intermediate portion 162 of the membrane 160.

The flywheel 103 can be cooled by air streams which flow in the channels 165 as well as by air streams which enter the clearance 130 at the left-hand side of the radially innermost portion 164 of the diaphragm 160 by way of openings 133 in the flywheel 103 and leave the clearance 130 by way of openings 134 in the disc-shaped portion 114 of the flywheel 102. The openings 133 further serve to afford access to the screws 108 as well as to facilitate introduction of the shanks of such screws into the registering holes 107 of the flywheel 102. The openings 134 are closely or immediately adjacent the seal 136 which prevents communication between the clearance 130 and the radially inner portion of the annular chamber 111. The seal 136 can constitute or include a diaphragm spring which is affixed to the member 155 and bears against the right-hand side of adjacent portion of the flywheel 102 or vice versa. The illustrated seal 136 is located at the level of the peripheral surface of the flywheel 103 (as seen in a direction from the common axis of the flywheels toward the annular chamber 111).

The sealing element 131 can constitute a diaphragm spring or a membrane and is installed between the member 155 and the wall 119, i.e., between the flywheel 102 and the cover 122 of the friction clutch 104. It is often advisable to design the sealing element 131 in such a way that it includes a radially extending portion which is sealingly received between the member 155 and the portion 157 of the ring 156. The member 155 is thereupon welded to the portion 157 of the ring 156 to ensure highly reliable sealing engagement of the sealing element 131 with the ring portion 157 as well as with the member 155.

The membrane 160 performs the additional function of centering the stressing arms 121, their supporting member 155 and the portion 157 of the ring 156 on the flywheel 103.

An advantage of the membrane 160 is that it can serve as a means for centering the cover 123 on the secondary flywheel 103 in the radial direction and that it can also locate the cover relative to the secondary flywheel in the axial direction of the two flywheels. The membrane contributes to compactness of the apparatus 101 because its thickness can be but a small fraction of the thickness of metallic sheet material of the cover 122. Since the projections 163 establish connections which prevent radial and axial movements of the secondary flywheel 103 and the intermediate portion 162 of the membrane 160 relative to each other, the membrane constitutes the means for transmitting torque from the primary flywheel 102 to the secondary flywheel.

Another advantage of the membrane 160 is that it performs the function of a thermal insulator or thermal barrier between the secondary flywheel 103 on the one hand and the viscous fluid and energy storing elements 110 in the annular chamber 111 on the other hand. The channel or channels 165 also contribute to removal of heat from the secondary flywheel 103 so that the latter is less likely to transmit excessive quantities of heat to the contents of the chamber 111.

The channel or channels 165 are provided in that (front) side of the secondary flywheel 103 which faces away from the clutch 104 and away from the friction surface 132. This is desirable and advantageous because the channel or channels 165 can be formed in the mold which is used to make the flywheel 103. The aforedescribed undertakings for cooling the secondary flywheel 3 or 103 can be used jointly or independently of each other, depending on the desired or necessary extent of cooling.

The cooling action can be enhanced still further by providing the pressure plate 128 with one or more radially and/or otherwise extending ventilating channels. Such channels can be provided in that side of the pressure plate 128 which faces away from the clutch plate 105 and secondary flywheel 103. If the pressure plate 128 is a casting, the ventilating channels in its right-hand side can be formed in the mold, the same as described in connection with the ventilating channels 165 in that side of the secondary flywheel 103 which faces away from the friction surface 132. The channels 165 and the channels of the pressure plate 128 can be said to constitute grooves which preferably extend substantially radially of the respective parts. The length of channels 165 preferably at least equals or exceeds the width of the friction surface 132 (as measured radially of the secondary flywheel 103), and the length of radial channels in the pressure plate 128 preferably at least matches or exceeds the width of the friction surface of the pressure plate, i.e., of that surface which bears upon the adjacent friction lining 129 when the friction clutch 104 is engaged.

It is equally possible to provide the secondary flywheel 103 with channels 165 which are straight but do not extend substantially radially of this flywheel and/or with arcuate and/or otherwise configurated channels which may but need not extend substantially radially. The same applies for the channels (if any) in the pressure plate 128.

The protuberance 115 can constitute a separately produced sleeve or a piece of pipe which is welded to the primary flywheel 103 and defines the passage 150 for the input element of the variable-speed transmission.

The apparatus of FIG. 2 can be modified by employing a protuberance which is an integral part of or which is secured to the secondary flywheel. Still further, at least one protuberance can be provided on each of the two flywheels and the anti-friction bearing or bearings can be disposed between the protuberances of the two flywheels.

In most instances, the protuberance is preferably provided on that flywheel (2 or 102) which defines a portion of or the entire annular chamber (11 or 111) for one or more dampers.

The protuberance 115 of FIG. 2 can constitute the inner race of the bearing 106. The outer race of this bearing is inwardly adjacent or is formed by the radially innermost portion of the membrane 160. The feature that one of the races is an integral part of one of the flywheels contributes to simplicity and compactness of the apparatus.

Figure 3:
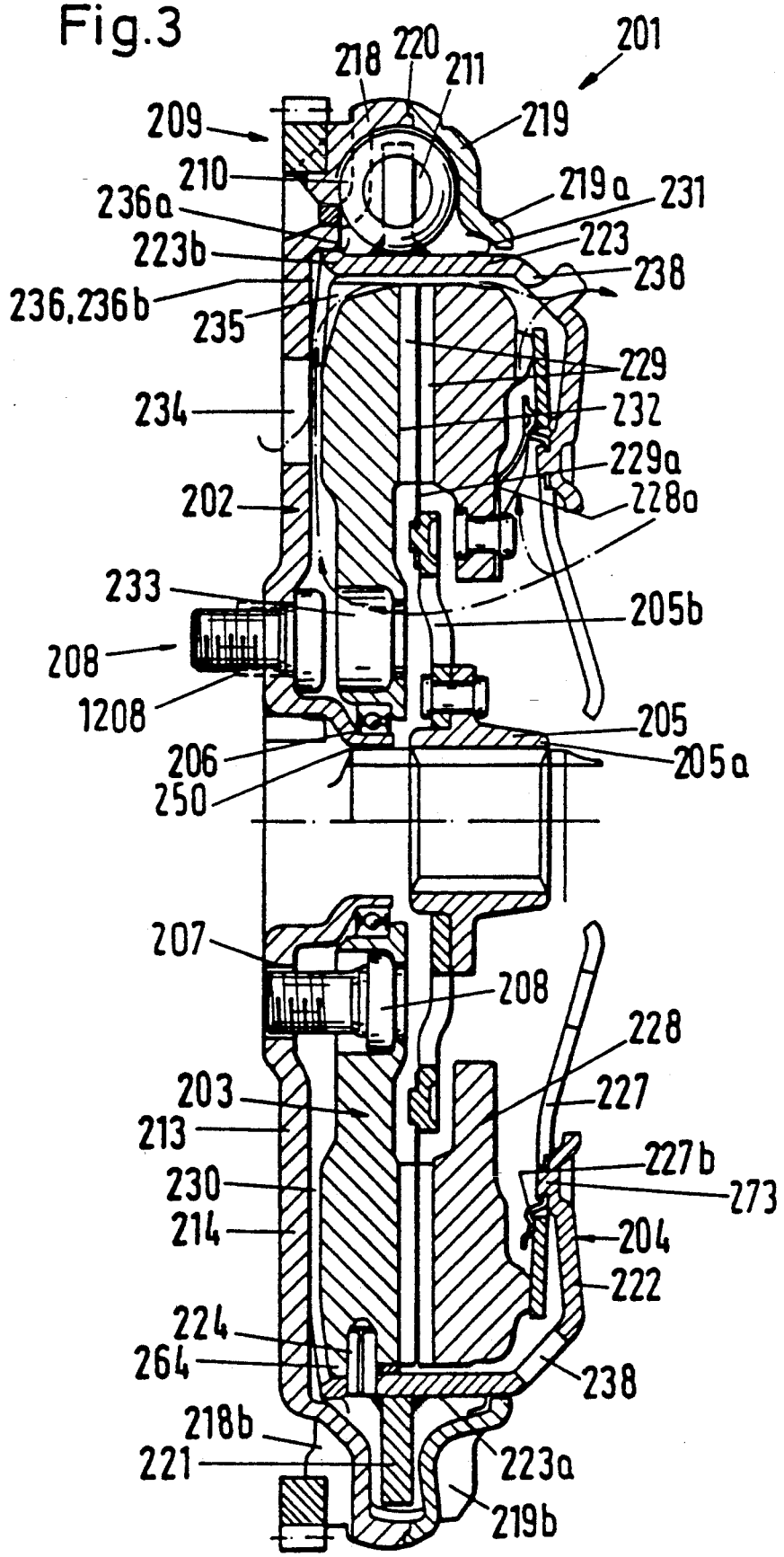
FIG. 3 is a smaller-scale axial sectional view of a third apparatus.

FIG. 3 shows certain details of a third torque transmitting apparatus 201 wherein all such parts which are identical with or clearly analogous to corresponding parts of the apparatus 1 of FIG. 1 are denoted by similar reference characters plus 200. The flywheel 202 is connectable with the rotary input element of a combustion engine (not shown) in the same way as described in connection with FIG. 1. One of a set of screws 208 (namely the upper screw of FIG. 3) is shown in extended position (as if driven into a tapped bore or hole of the output element) and is surrounded by a yieldable sleeve-like element 1208 which ensures that the shank of this screw remains in the respective hole 207 in a given axial position unless intentionally displaced as a result of rotation by a suitable tool, not shown. The other (lower) screw 208 is shown in a position of readiness in which its shank does not project to the left beyond the exposed side or surface of the disc-shaped portion 214 of the flywheel 202.

An antifriction bearing 206 is installed between an integral protuberance of the flywheel 202 and the surface bounding an axial passage at the center of the flywheel 203.

The difference between the main portion 13 of the flywheel 2 and the main portion 213 of the flywheel 202 is primarily that the axially extending toroidal portion 218 does not extend to both sides of the disc-shaped portion 214 but only in a direction to the right so that the annular chamber 211 for the energy storing elements 210 of the damper 209 is located radially outwardly of and directly surrounds the axially extending portion 223 of the cover 222. The latter forms part of the friction clutch 204 which is provided on the flywheel 203. The axially extending portion 218 of the flywheel 202 cooperates with the component or wall 219 to directly surround and to closely follow the outlines of substantial portions (e.g., the radially outer halves) of the energy storing elements 210 in the radially outermost portion of the chamber 211. The convolutions of the energy storing elements 210 bear against and are guided by the internal surfaces of the portion 218 and wall 219 when the flywheels 202 and 203 rotate about their common axis. If desired or necessary, a suitable wear-resistant liner (see FIG. 1) can be installed between the internal surfaces of the portion 218 and wall 219 on the one hand and the adjacent portions of convolutions of the energy storing elements 210 on the other hand. This prolongs the useful life of the energy storing elements 210, of the portion 218 and/or of the wall 219.

FIG. 3 shows that the toroidal portion 218 of the flywheel 202 is in radial alignment with the second flywheel 203. This contributes to even more pronounced compactness of the torque transmitting apparatus 201, i.e., the first flywheel 202 can be said to completely surround and confine the flywheel 203 so that only certain parts of the friction clutch 204 project axially beyond the two flywheels.

FIG. 3 further shows that the axially extending toroidal portion 218 of the flywheel 202 and the toroidal wall 219 are virtual mirror images of each other, i.e., each of these parts surrounds approximately or exactly one-half of the radially outermost portion of the annular chamber 211 and half or nearly half of each energy storing element 210. The portion 218 and the wall 219 are made of metallic sheet material and are welded to each other, as at 220, in such a way that they seal the radially outermost portion of the chamber 211 from the atmosphere. As already described with reference to FIG. 1, the annular chamber 211 is divided into discrete compartments each of which confines one of the energy storing elements 210 and each of which is separated from the adjacent compartment by a partition cooperating with one of the stressing arms 221 to cause the elements 210 to store energy in response to angular displacement of at least one of the flywheels 202, 203 relative to the other flywheel. The partitions are formed as a result of depression of pockets 218b in the external surface of the sheet metal portion 218 and as a result of formation of pockets 219b in the external surface of the wall 219. Each pocket 219b is located opposite a pocket 218b.

The axially extending (substantially cylindrical) portion 223 of the cover 222 is located radially inwardly of and is surrounded by the chamber 211. The cylindrical portion 223 surrounds the entire flywheel 203 as well as the friction linings 229 of the clutch plate 205 and the pressure plate 228 of the friction clutch 204. The flywheel 203 is non-rotatably connected to the cylindrical portion 223 of the cover 222 by radially extending pins 224, sleeve-like fasteners or analogous parts. The illustrated pins 224 extend through registering radial bores or holes which are provided therefor in the cylindrical portion 223 and in the peripheral surface of the flywheel 203. It is equally possible to employ threaded fasteners or to weld the cylindrical portion 223 to the flywheel 203.

The stressing arms 221 for the energy storing elements 210 in the compartments of the chamber 211 are welded to the external surface 223a of the axially extending cylindrical portion 223 of the cover 222 and are spaced apart from the free end 223b of the cylindrical portion 223. The free end 223b is immediately or closely adjacent the inner side of the disc-shaped portion 214 of the flywheel 202. Each energy storing element 210 can be stressed by one of the arms 221 and by the corresponding partition between the respective pockets 218b, 219b. In the embodiment of FIG. 3, the arms 221 are separately produced parts each of which is individually welded or otherwise reliably secured to and extends from the external surface 223a of cylindrical portion 223 of the cover 222. Mounting of the arms 221 in such a way that they are spaced apart from the free end 223b of the cylindrical portion 223 contributes to stability of the arms 221 because each of these arms is surrounded by circumferentially complete parts of the cylindrical portion 223 at the left-hand side as well as at the right-hand side. Otherwise stated, those parts of the cylindrical portion 223 which are welded to the radially inner ends of the arms 221 are less likely to undergo deformation when the arms 221 engage and stress the adjacent energy storing elements 210 than if the radially innermost portions of the arms 221 were welded or otherwise affixed to the free end 223b of the cylindrical portion 223.

FIG. 3 shows that the arms 221 are substantially or nearly coplanar with friction linings 229 of the clutch plate 205.

An advantage of separately produced arms 221 which are subsequently bonded or otherwise connected to the cylindrical portion 223 is that the arms 221 can be made of a material whose mechanical properties (such as resistance to wear and/or resistance to deformation) are superior to the properties of the material of the cover 222. The wear upon the cover 222 is a minute fraction of wear upon the arms 221 so that the quality of the apparatus 201 is not affected by making the cover 222 of a material which is less resistant to wear than the material of the arms 221.

At least a portion of the chamber 211 is filled with a viscous fluid (such as oil or grease), and the fluid is confined in the chamber 211 by sealing means including a resilient sealing element 236. This sealing element can include or constitute a membrane and includes an axially extending portion 236a which is a tight fit on the external surface of the free end 223b of cylindrical portion 223 of the cover 222. A radially extending portion 236b of the resilient sealing element 236 resembles a washer having an innermost portion which abuts the inner side of main portion 213 of the flywheel 202. The radially extending portion 236b is installed in stressed condition so that it bears against the flywheel 202 in order to seal the radially inner portion of the annular chamber 211 from the clearance 230 between the two flywheels.

The apparatus 201 of FIG. 3 is ideally suited for use in motor vehicles wherein the means for transmitting torque between the engine and the variable-speed transmission cannot occupy much space in the axial direction of the flywheels. As can be seen in FIG. 3, the annular chamber 211 is located radially outwardly of the cylindrical portion 223 of the cover 222 and immediately surrounds the flywheel 203 as well as the friction linings 229 and a portion of the pressure plate 228, i.e., the radially outermost portions of flywheel 229 and of a major part of the friction clutch 204 are surrounded by the chamber 211.

The means for cooling the flywheel 203 includes the clearance 230 which communicates with openings or holes 234 in the disc-shaped portion 214 of the flywheel 202, with openings or holes 233 in the radially inner portion of the flywheel 203, and with openings 235 in the radially outermost portion of the flywheel 223 inwardly adjacent the cylindrical portion 223 of the cover 222. Circulation of cooling air is enhanced by openings or ports 238 in the region where the cylindrical portion 223 merges into the radially extending portion of the cover 222. The openings 238 can constitute slots which are obtained by bending portions of the material of the cover 222 radially outwardly and/or axially outwardly so that the outwardly bent portions of the cover 222 act not unlike vanes or blades and enhance the cooling action of air upon the exterior of the cover 222. Moreover, the vanes or blades of the cover 222 promote the circulation of air along the right-hand side of the pressure plate 228 and along the diaphragm spring 227. Air which issues from the openings 234 exerts a cooling action between the engine and the external surface or outer side of disc-shaped portion 214 of the flywheel 202. The air stream or streams in the clearance 230 cool the left-hand side of the flywheel 203. The air streams which issue from the ports 238 can even produce a cooling action upon the variable-speed transmission. The ports 238 can act as suction intakes which draw streamlets of air from the interior of the friction clutch 204. Various air streams which develop when the flywheels 202, 203 rotate are indicated in FIG. 3 by broken-line arrows.

A sealing element 231 is interposed between the frustoconical portion 219a of the wall 219 and the external surface 223a of cylindrical portion 223 of the cover 222. The portion 219a extends in the axial direction of the flywheels 202, 203 and its diameter decreases in a direction away from the chamber 211. The sealing element 231 has a V-shaped or C-shaped or U-shaped cross-sectional outline and its inner half can be shrunk or otherwise sealingly applied over the adjacent portion of the external surface 223a. The outer half of the sealing element 231 is a hollow conical frustum which sealingly engages the inner side of the frustoconical portion 219a. It is often desirable to mount the sealing element 231 in such a way that its conical outer half and the portion 219a define a diaphragm gland or a labyrinth seal so that the element 231 need not actually touch the wall 219. This greatly reduces the wear upon and prolongs the useful life of the sealing element 231. Absence of friction between the sealing element 231 and the wall 219 is desirable and advantageous on the additional ground that such friction could adversely influence the characteristic of the damper 209, especially in the region of the zero position. However, it is equally within the purview of the invention to employ a sealing element 231 at least the outer half of which is elastic and is installed in stressed condition to bear upon the inner side of the frustoconical portion 219a of the wall 219.

The utilization of a sealing element 231 which includes a frustoconical outer half and cooperates with the inner side of the frustoconical portion 219a of the wall 219 exhibits the advantage that any oil or grease which happens to penetrate between the sealing element 231 and the portion 219a tends to creep radially outwardly along the inner side of the wall 219 under the action of centrifugal force, i.e., back into the annular chamber 211.

The hub 205a of the clutch plate 205 has internal splines or teeth for engagement with complementary splines or teeth at the exterior of the input shaft of the variable-speed transmission so that the hub 205a can move axially of the input shaft but cannot rotate relative thereto. The flange or carrier 205b of the clutch plate 205 is riveted or otherwise secured to the hub 205a and carries the friction linings 229 which are disposed between the friction surface 232 of the flywheel 203 and the adjacent surface of the pressure plate 228.

Figure 4:
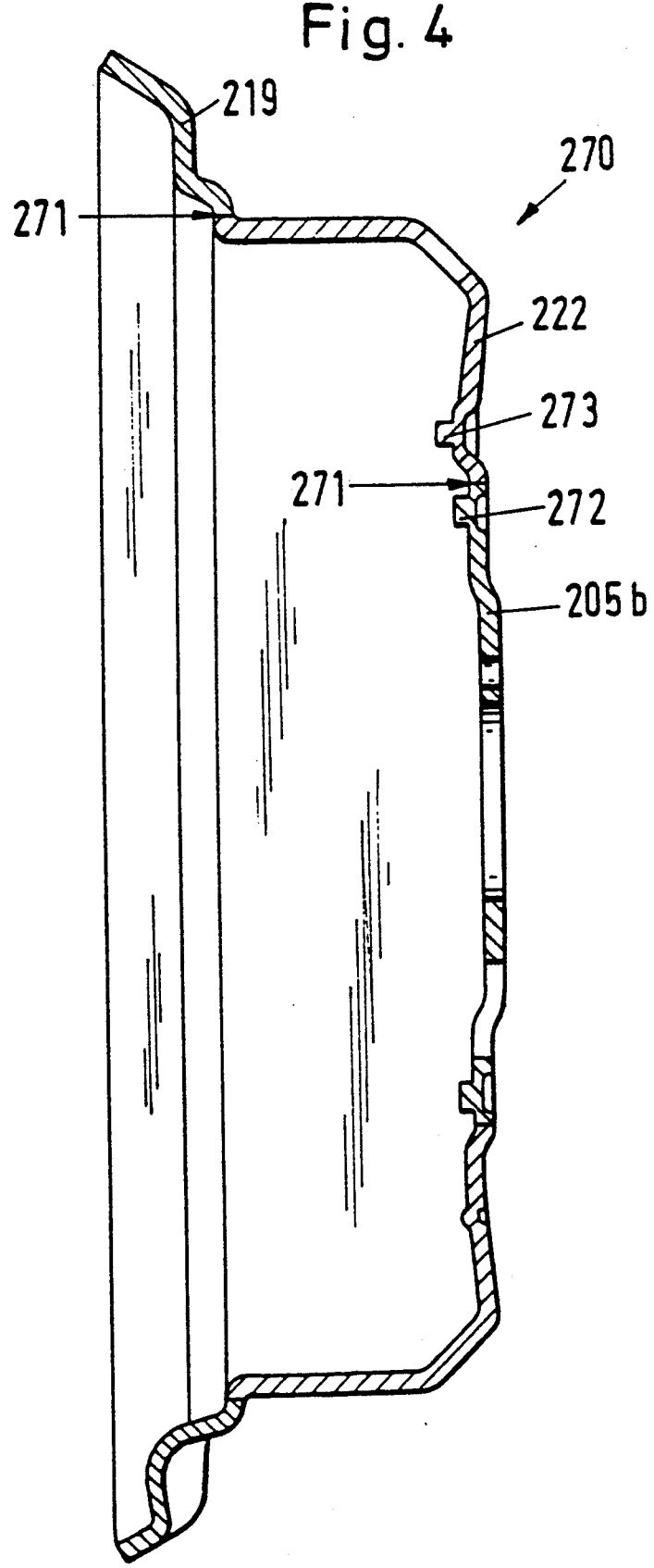
FIG. 4 is an axial sectional view of a blank which can be subdivided into three parts of the torque transmitting apparatus of FIG. 3.

The cost of the torque transmitting apparatus 201 can be reduced considerably by resorting to a one-piece blank 270 of the type shown in FIG. 4. This blank can be produced by stamping or in any other suitable way and is thereupon severed at 271 and 271a to thus yield a cover 222, a wall 219 and a flange or friction lining carrier 205b. Thus, the sheet material of the wall 219 is the same as that of the cover 222 and that of the carrier or flange 205b. It is clear that the blank can be designed in such a way that it is to be severed at a single location (at 271 or at 271a) in order to be divided into a wall 219 and a cover 222 or into a cover 222 and a flange 205b. An advantage of the blank 270 is that three parts of the torque transmitting apparatus 201 can be produced simultaneously and with a very high degree of accuracy and reproducibility. Moreover, the percentage of waste is greatly reduced and can be reduced all the way to zero. All that is necessary is to make a ring-shaped cut at 271 and a ring-shaped cut at 271a.

FIG. 4 further shows that the blank portion which is to constitute the cover 222 can be provided with projections 273 which are to be converted into rivets (see FIG. 3) serving to hold an annular seat 227b for the diaphragm spring 227. The projections 272 are lugs which are provided on the blank portion about to constitute the flange or carrier 205b. The lugs 272 are used to secure sections 229a of friction linings 229 to the finished flange 205b.

One of the leaf springs which serve to axially movably but non-rotatably couple the pressure plate 228 to the cover 222 and to bias the pressure plate 228 axially and away from the friction linings 229 is shown in FIG. 3, as at 228a.

Pronounced compactness of the apparatus 201 (as seen in the axial direction of the flywheels 202, 203) is attributable to the fact that the dimensions of the clutch plate 205 and pressure plate 228 are selected with a view to ensure that these parts (together with the flywheel 203) can be introduced into the space which is surrounded by the annular chamber 211. Thus, not only the friction surface 232 of the flywheel 203 but also the friction surface of the pressure plate 228 is located radially inwardly of the radially innermost portions of energy storing elements 210 in the chamber 211. These features render it possible to encapsulate the secondary flywheel 203 and at least the major part of the friction clutch 204 in the space which is surrounded by the annular chamber 211. The primary flywheel 202 (this flywheel includes the portions 214, 218 and the wall 219 when the making of the welded joint 220 is completed) can be said to constitute a shallow pan the radially outermost portion of which receives the supply of viscous fluid and the energy storing elements 210, and the remaining (central) part of which receives the secondary flywheel 203 and the major part of the friction clutch 204.

The inner race of the bearing 206 can constitute an integral part of the flywheel 202 and/or the outer flange of this bearing can constitute an integral part of the flywheel 203. The inner race can be an integral part of the projection 250 so that the latter performs several functions including centering the input element of the transmission and locating the rolling elements of the bearing.

The discrete stressing arms 221 can constitute simple flat stampings of a material which can be readily welded to the axially extending portion 223 of the cover 222. Since the arms 221 are spaced apart from the free end 223b of the axially extending portion 223, the latter is less likely to be deformed by the arms 221 when such arms are called upon to cause the adjacent elements 210 to store additional energy, or the cover 222 can be made of thinner material because even such cover can properly withstand deforming stresses which develop when at least one of the flywheels rotates relative to the other flywheel so that the arms 221 cooperate with the partitions including the retainers of the primary flywheel to stress the energy storing elements 210.

The blank 270 of FIG. 4 can be formed in a deep drawing, stamping, embossing or like machine.

It is often desirable to establish a discrete thermal barrier between that flywheel which carries the antifriction bearing and the chamber for the damper or dampers. FIG. 3 shows a thermal insulator or barrier 264 which is installed between the peripheral surface of the flywheel 203 and the cylindrical portion 223 of the cover 222. The thermal insulator 264 can constitute a one-piece annular body which extends all the way around the flywheel 203. Alternatively, such thermal insulator can be assembled of two or more arcuate sections. In either event, the insulator 264 is preferably located adjacent the openings 235. The illustrated insulator 264 is assumed to be assembled of several arcuate sections one of which is shown in the lower part of FIG. 3. The utilization of a composite thermal insulator is desirable and advantageous because the sections of a composite insulator can be distributed in such a way that they do not interfere with the flow of a coolant in the openings 235.

An important advantage of the thermal insulator 264 is that heat which develops when the clutch 204 is actuated cannot be readily transmitted from the heated flywheel 203 to the cover 222 and thence (via cylindrical portion 223 and arms 221) to the supply of viscous fluid and to the energy storing elements 210 in the annular chamber 211. Thus, the insulator 264 prevents thermal overstressing of the confined viscous fluid and/or of the energy storing elements 10. The provision of such thermal insulator constitutes a contribution which is believed to be worthy of patent protection with or independently of other novel features of the improved torque transmitting apparatus. Similar or identical thermal insulators or barriers can be installed in each of the described and shown torque transmitting apparatus. For example, a thermal barrier or insulator can be installed in the apparatus 101 of FIG. 2 between the radially outermost portion 161 of the membrane 160 and the radially outermost portion 159 of the cover 122 and/or the radially outermost portion 156a of the ring 156. Each torque transmitting apparatus can be provided with two or more thermal insulators.

The thermal insulator or insulators can be made of a highly heat-resistant plastic material such as, for example, polyamidide or polyether ether ketone (PEEK).

The illustrated thermal insulator 264 is particularly effective in the region between the hot secondary flywheel 203 and the arms 221 which contact the supply of viscous liquid and the energy storing elements 210, i.e., this thermal insulator is effective to prevent overheating of the arms 221 and hence an overheating of the viscous liquid and/or of the energy storing elements 210. This contributes to longer useful life of the damper 209 and of the entire torque transmitting apparatus 201. The thermal insulator 264 also serves as a means for shielding the clutch cover 222 from overheating because it is installed between the peripheral surface of the secondary flywheel 203 and the cylindrical portion 223 of the cover 222.

Figure 5:
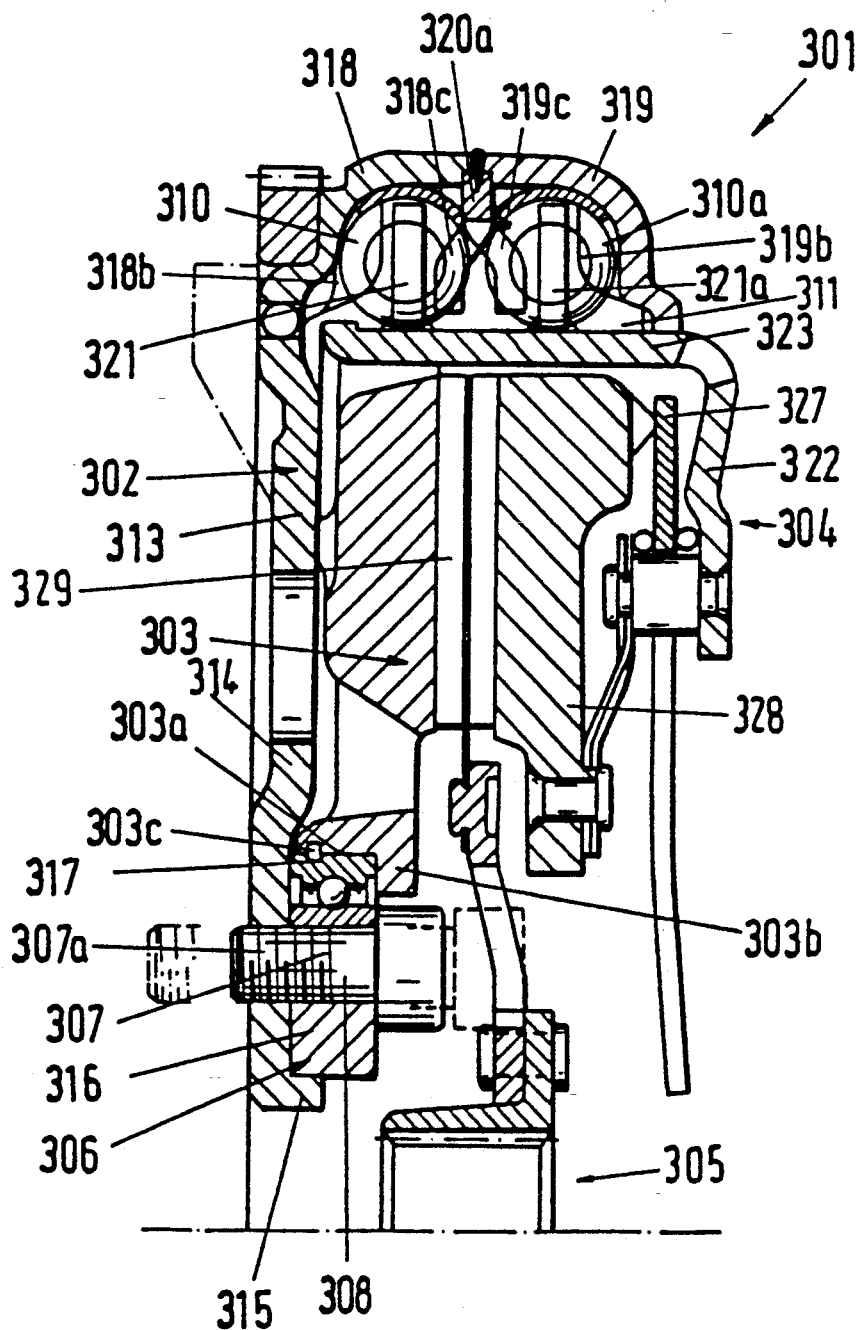
FIG. 5 is a fragmentary axial sectional view of a fourth torque transmitting apparatus.

FIG. 5 shows a torque transmitting apparatus 301. All such parts of this apparatus which are identical with or clearly analogous to corresponding parts of the apparatus 1 of FIG. 1 are denoted by similar reference characters plus 300. The apparatus 301 constitutes a modification of the apparatus 201 of FIG. 3 and differs from the apparatus 201 in that the annular chamber 311 accommodates two dampers respectively having circumferentially extending arcuate energy storing elements 310, 310a in the form of coil springs. The friction clutch 304 comprises a cover 322 having an axially extending cylindrical portion 323 which surrounds the flywheel 303, the friction linings 329 of the clutch plate 305, the pressure plate 328 and the diaphragm spring 327. The main portion 313 of the primary flywheel 302 includes the disc-shaped portion 314 and the axially extending portion 318 which cooperates with the wall or component 319 to define the annular chamber 311. The energy storing elements 310 alternate with stressing portions or arms 321 which are welded or otherwise reliably secured to the external surface of the cylindrical portion 323 in a manner similar to that described with reference to the stressing arms 221 of FIG. 3. The energy storing elements 310a alternate with stressing portions or arms 321a which are also secured to the external surface of the cylindrical portion 323. The arms 321 cooperate with partitions which are formed as a result of provision of pockets 318b in the external surface of the axially extending portion 318, and the arms 321a cooperate with partitions which are formed as a result of the provision of pockets 319b in the external surface of the wall 319. Each pocket 318b is located opposite a retainer 318c which forms part of a ring 320a welded to the abutting ends of the axially extending portion 318 and wall 319. The ring 320a further carries retainers 319c each of which is located opposite a pocket 319b. The pockets 318b and the retainers 318c are staggered relative to the pockets 319b and the retainers 319c in the circumferential direction of the flywheels 302 and 303. The retainers 218c, 219c are disposed between the two sets of stressing arms 321, 321a (as seen in the axial direction of the flywheels 302, 303).

The ring 320a can be omitted if the retainers 318c, 319c are welded directly to the flywheel 302, namely to the axially extending portion 318 and to the wall 319, respectively. The portion 318 and the wall 319 can be considered to constitute integral parts of the flywheel 302. The retainers 318c can constitute integral parts of the axially extending portion 318, and the retainers 319c can constitute integral parts of the wall 319. Irrespective of the manner of forming and securing the retainers 318c, 319c to the flywheel 302, they are provided at the internal surface of that part (318, 319) of the flywheel 302 which is radially outwardly adjacent the annular chamber 311.

The distribution of retainers 318c and pockets 318b on the one hand, and of the retainers 319c and pockets 319b on the other hand (as seen in the circumferential direction of the cylindrical portion 323), is preferably such that each retainer 318c and the corresponding pocket 318c are located substantially midway between the ends of an energy storing element 310a, and that each retainer 319c and the corresponding pocket 391b are located substantially midway between the ends of an energy storing element 310. In other words, the compartments for the elements 310 are staggered relative to the compartments for the elements 310a in the circumferential direction of the cylindrical portion 323. Each energy storing element 310 is located between a stressing arm 321 (which can turn with the flywheel 303) and a composite partition including one of the retainers 318c and the corresponding depression in the axially extending portion 318 adjacent the respective pocket 318b. Analogously, each energy storing element 310 is confined between an arm 319a and a retainer 319c which, in turn, is aligned with the depressed portion of the wall 319a adjacent the respective pocket 319b. Each of the arms 321 is located in or close to a plane including the axes of the energy storing elements 310, and each arm 321a is located in or close to a plane including the axes of the energy storing elements 310a. The pockets 318b and the retainers 318c are located at opposite sides of the plane of the arms 321, and the pockets 319b and the retainers 319c are located at opposite sides of the plane of the arms 321a. Such distribution of the pockets 318b, 319b, retainers 318c, 319c and arms 321, 321a ensures highly predictable and optimal stressing of the energy storing elements 310, 310a in response to angular displacement of at least one of the flywheels 302, 303 relative to the other flywheel.

As mentioned above, the ring 320a is optional because the retainers 318c can constitute integral parts of the axially extending portion 318 and the retainers 319c can constitute integral parts of the wall 319.

The energy storing elements 310 operate in parallel with the energy storing elements 310a. However, it is within the purview of the invention to assemble a composite damper, including two sets of energy storing elements, in such a way that the energy storing elements 310 operate in series with the energy storing elements 310a.

The secondary flywheel 303 is mounted on the outer race 317 of an antifriction ball bearing 306 which has an inner race 316 traversed by holes for the shanks of screws 308. The flywheel 303 has an axial passage 303a for the outer race 317. In order to ensure that the flywheel 303 will not be caused to move axially in response to disengagement of the friction clutch 304, the flywheel 303 comprises a radially inwardly extending collar 303b which is located at the right-hand end of the passage 303a for the outer race 317. The latter abuts the adjacent shoulder of the collar 303b. The flywheel 303 can be shrunk onto the outer race 317 of the bearing 306, or the outer race 317 can be a press fit in the passage 303a.

It is further possible to secure the outer race 317 and the flywheel 303 against axial movement relative to each other by providing the surface surrounding the passage 303a with a groove for a split ring 303c which also extends into a groove in the external surface of the outer race 317.

The inner race 316 of the bearing 306 surrounds a short annular protuberance 315 of the flywheel 302 and such inner race can be said to serve as a washer for the heads of the screws 308. When the screws 308 are driven home into the tapped bores of the output element of an engine, their heads bias the inner race 316 against the inner side of the disc-shaped portion 314 to ensure that the bearing 306 is maintained in a predetermined axial position, namely immediately adjacent the inner side of the disc-shaped portion 314. The inner race 316 has bores or holes 307a which are in register with the holes 307 in the disc-shaped portion 314. The diameters of the holes 307 can match the diameters of the holes 307a. The protuberance 315 serves as a means for centering the bearing 306 in the flywheel 302, and the outer race 317 centers the flywheel 303 on the flywheel 302. As shown in FIG. 5, the axial length of the protuberance 315 can be less than the axial length of the inner race 316. The inner race 316 can be a press fit on the protuberance 315, and the flywheel 303 can be mounted directly on the outer race 317. In order to avoid overheating of the bearing 306, the apparatus 301 of FIG. 5 can be provided with a thermal insulator (e.g., a cylindrical insert of suitable plastic material) which is interposed between the flywheel 303 and the outer race 317 of the bearing 306.

FIGS. 6 and 7 show a modification of the apparatus 201 or 301. The secondary flywheel 403 is surrounded by the axially extending cylindrical portion 423 of the cover 422. The flywheel 403 is welded (at 424) to the cylindrical portion 423 by way of one or more projections or inserts 474 made of steel or another material which can be readily bonded to the material of the cylindrical portion 423. The illustrated insert 474 comprises a centrally located lobe 474a which extends radially inwardly and is bounded by a convex surface abutting a complementary concave surface in a recess 475 provided in the periphery of the flywheel 403. Thus, the lobe 474a prevents angular movements of the insert 474 and the flywheel 403 relative to each other. The insert 474 further comprises two extensions 474b, 474c at the ends of the lobe 474a. These extensions are received in a groove 476 of the flywheel 403 so that the latter cannot move axially relative to the insert 474 and/or vice versa. As a rule, the flywheel 403 is a metallic casting.

The peripheral surface of the flywheel 403 is normally provided with several equidistant recesses 475 each of which receives the lobe 474a of a discrete insert 474. The recesses 475 are provided at one side face of the flywheel 403 and they communicate with the circumferentially extending groove 476 which is machined into or is otherwise formed in the peripheral surface of the flywheel 403 to receive the extensions 474b, 474c of all inserts 474. Once an insert 474 is properly installed in the respective recess 475 and in the adjacent portion of the groove 476, and the flywheel 403 is inserted into the cylindrical portion 423 of the cover 422, the insert is reliably held against axial and/or radial movement relative to the flywheel 403.

FIG. 6 shows that the welded joint 424 which bonds the illustrated insert 474 to the flywheel 403 is located between the free end 423b of the cylindrical portion 423 and the plane for the stressing arms 421 which alternate with the energy storing elements (not shown) of the damper acting between the flywheels 402 and 403.

In order to connect the flywheel 403 to the cover 422, the inserts 474 are properly installed in the flywheel 403 in the aforedescribed manner, i.e., the lobes 474a abut the concave surfaces in the respective recesses 475 and the extensions 474b, 474c are received in the groove 476. The next step involves placing the clutch plate 405 next to the friction generating surface 432 of the flywheel 403, the latter is then introduced into the cylindrical portion 423 of the cover 422, and the cylindrical portion 423 is ready to be welded (as at 424) to the inserts 474, i.e., to the flywheel 403.

FIG. 8 shows that the secondary flywheel 503 can be welded (at 524) to the cylindrical portion 523 of the cover 522 in a different way. The peripheral surface of the flywheel 503 is formed with radially extending blind bores or holes 575 each of which receives a pin-shaped or rivet-shaped projection or insert 574 consisting of a material which can be readily welded to the cylindrical portion 523. For example, the inserts 574 can be made of steel, the same as the cover 522. The inserts 574 can be deformed upon insertion into the respective bores or holes 575 so that they at least substantially fill the respective bores or holes 575 and their external surfaces are in full contact with the surfaces bounding the bores 575. This prevents stray movements of the flywheel 503 relative to the cylindrical portion 523. The axial position of the welded joint 524 relative to the free end 523b of the cylindrical portion 523 and the adjacent stressing arm 521 is the same as described for the joint 424 of FIG. 6.

The character 502 denotes a portion of the primary flywheel which is closely or immediately adjacent the flywheel 523 and defines with the latter a radially extending annular clearance corresponding to the clearance 30 in the apparatus 1 of FIG. 1.

The stressing arms 421, 521 are preferably staggered or offset relative to the welded joints 424, 524 in the circumferential direction of the respective flywheels 403, 503. Such staggering of the stressing arms is desirable and advantageous because the stressing arms are not in the way during making of the welded joints 424, 524.

The apparatus for forming the welded joints 424, 524 from the external surfaces of the cylindrical portions 423, 523 are well known in the art. Such apparatus can constitute spot welding machines, laser welders or capacitive (stored energy) welding machines.

Figure 9:
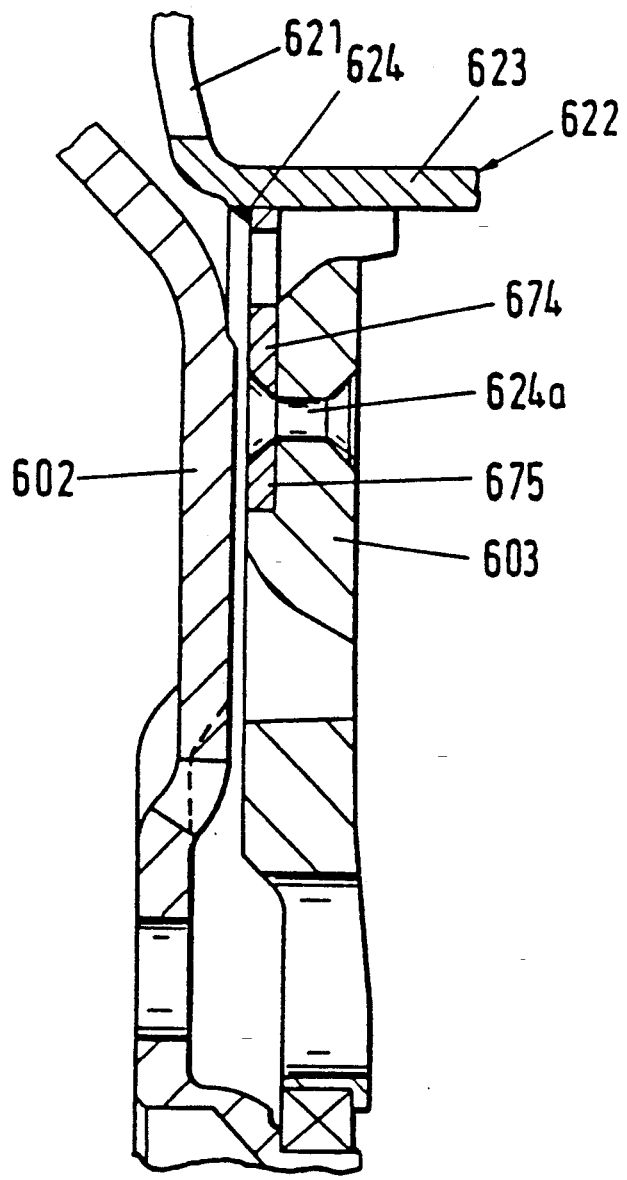
FIG. 9 is a fragmentary axial sectional view of a detail showing a third mode of connecting the cover of the friction clutch with the adjacent flywheel.

FIG. 9 shows a portion of a torque transmitting apparatus wherein the cylindrical portion 623 of the cover 622 of the friction clutch is integral with stressing arms 621 and the cylindrical portion 623 is welded to the radially outermost portion of a washer-like insert 674. The insert 674 extends into a recess 675 at the front side of the secondary flywheel 603 and is reliably secured to this flywheel by rivets 624a. The welded joint between the cylindrical portion 623 and the insert 674 is shown at 624. The orientation of the arms 621 can be the same as that of the arms 21 in the apparatus 1 of FIG. 1. The rivets 624a are preferably designed and mounted in such a way that they hold the insert 674 against any (axial and/or radial) movement relative to the flywheel 603. The latter is immediately or closely adjacent the primary flywheel 602.

Figure 10:
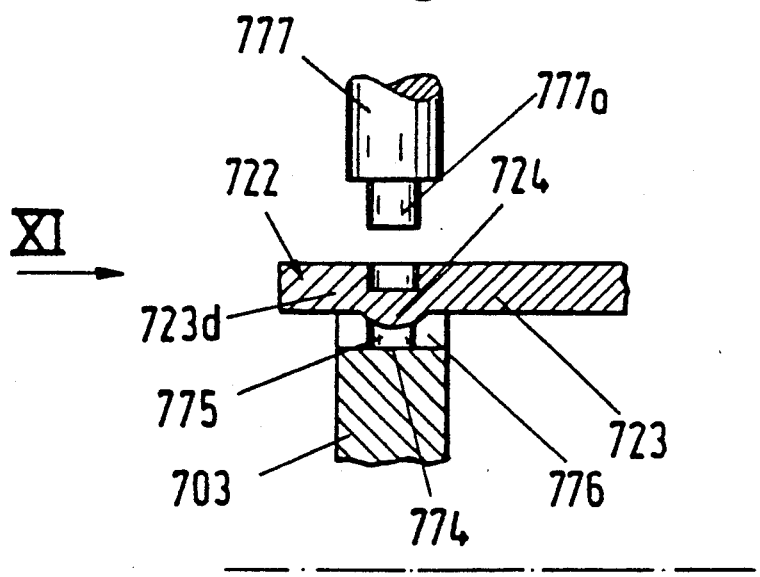
FIG. 10 is a fragmentary axial sectional view of a detail showing a further mode of connecting the cover of the friction clutch to the adjacent flywheel.
Figure 11:
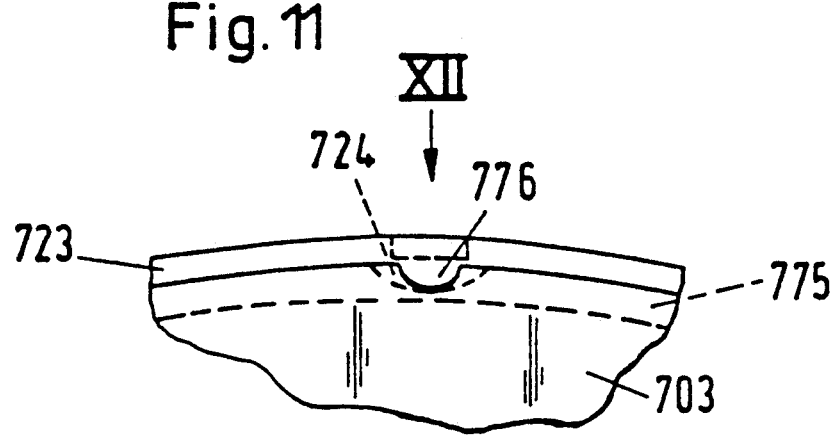
FIG. 11 is a view substantially as seen in the direction of arrow XI in FIG. 10.
Figure 12:
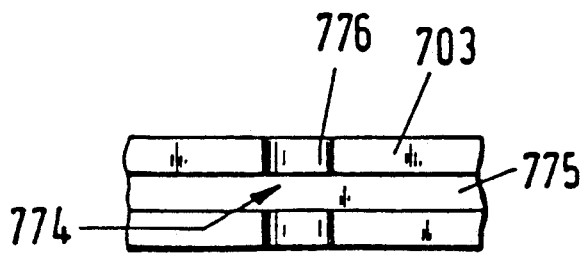
FIG. 12 is a view substantially as seen in the direction of arrow XII in FIG. 11.

FIGS. 10 to 12 illustrate a further mode of non-rotatably connecting the secondary flywheel 703 with the cylindrical portion 723 of the cover 722. The cylindrical portion 723 can constitute one of several cylindrical portions of the cover 722, and the illustrated portion 723 has sections 723d extending axially of the apparatus and transversely as well as circumferentially of the peripheral surface of the flywheel 703. The sections 723d have projections 724 in the form of lobes or warts. Such projections extend into complementary recesses or sockets 774 in the peripheral surface of the flywheel 703. The recesses 774 have a cruciform shape (FIG. 12). To this end, the peripheral surface of the flywheel 703 is provided with a circumferentially extending groove 775 (having a square or rectangular cross-sectional outline) and with axially parallel grooves 771 which cross the groove 775 to thus define the respective recesses 774. The axially extending grooves 776 are bounded by concave surfaces of the flywheel 703, and each such surface preferably extends along an arc of at least close to 180°. The grooves 776 cross the circumferentially extending groove 775 at an angle of or close to 90°. The depth of the grooves 776 can equal or approximate the depth of the groove 775. It is presently preferred to select the dimensions of the axially parallel grooves 776 in a manner as shown in FIG. 11, i.e., the deepmost portions of the grooves 776 are located slightly radially outwardly of the bottom surface in the groove 775.

An advantage of the cruciform recesses 774 is that the material of the cylindrical portion 723 can flow into such recesses during formation of the lobes 724, i.e., during application of deforming force by a tool 777 which is shown in FIG. 10 and has a cylindrical or polygonal working end 777a. The working end 777a penetrates into the external surface of the cylindrical portion 723 outwardly adjacent an intersection of the groove 775 with a groove 776 to thus form a lobe 724 which penetrates into the adjacent portions of the circumferentially extending groove 775 as well as into portions of the respective axially parallel groove 776 at both sides of the groove 775. This ensures the establishment of a connection which ensures that the cover 722 and the flywheel 703 cannot move relative to each other in the axial and/or circumferential direction of the secondary flywheel.

The feature that the displaced material of the cylindrical portion 723 can flow into the groove 775 simultaneously with flow of such material into the respective groove 776 ensures that the grooves 775, 776 can receive greater or smaller quantities of material of the cover 223. This greatly reduces the likelihood of cracking or chipping of the flywheel 703 (which is normally a casting) in the region of a recess 774. The reason is that the displaced material of the cylindrical portion 723 has room to flow into the groove 775 and into both halves of the respective groove 776 irrespective of whether the working end 777a of the tool 777 displaces a larger or a smaller quantity of material of the cylindrical portion 723. Thus, the flywheel 703 is not unduly stressed in the regions of its recesses 774 because such recesses are designed to receive larger or smaller quantities of ductile material of the cylindrical portion 723, i.e., each recess can receive a larger or smaller lobe 724 without affecting the integrity of the flywheel 703 and/or the reliability of connection between such flywheel and the cylindrical portion 723. The deforming action of the tool 777 is preferably such that the material of the cylindrical portion 723 is caused to flow into the recesses 774. The working end 777a of the illustrated tool 777 is a relatively short cylinder. The mechanism or machine which is used to force the working end 777a of the tool 777 into the external surface of the cylindrical portion 723 is not shown because it forms no part of the present invention.

The making of connections by way of recesses 774 and lobes 724 is as follows:

The flywheel 703 is introduced into the cylindrical portion 723 of the cover 722 to an extent which is necessary to ensure adequate stressing of the diaphragm spring forming part of the friction clutch including the cover 722 (note the diaphragm spring 27 in the apparatus 1 of FIG. 1). Stressing of the diaphragm spring should suffice to ensure predictable engagement and disengagement of the friction clutch which includes the cover 222 for the entire contemplated useful life of the torque transmitting apparatus. The tool 777 is put to use once the diaphragm spring is properly stressed, and the cylindrical portion 723 is thus provided with lobes 724 which penetrate into the adjacent portions of the grooves 775, 776 to impart to the lobes a cruciform shape which is ideally suited to ensure the establishment of a highly reliable connection against movements of the cylindrical portion 723 in the axial and circumferential directions of the flywheel 703.

The torque transmitting apparatus which embodies the structure of FIGS. 10 to 12 need not be provided with a shoulder corresponding to the shoulder 25 in the apparatus 1 of FIG. 1, i.e., it is not necessary to provide a means (other than the lobes 724) for ensuring that the axial and angular positions of the flywheel 703 relative to the cover 722 will remain unchanged during the entire useful life of the apparatus.

Another advantage of the apparatus which embodies the structure of FIGS. 10 to 12 is that it can compensate for any and all tolerances which influence the stressing of the diaphragm spring in the friction clutch of a fully assembled torque transmitting apparatus. Thus, the flywheel 703 is simply forced into the cylindrical portion 723 and toward the pressure plate and diaphragm spring of the friction clutch until the diaphragm spring stores a requisite accurately determined amount of energy such as is needed for predictable engagement and disengagement of the friction clutch. The mode of operation of a friction clutch wherein the diaphragm spring is stressed in a manner as described with reference to FIGS. 10 to 12 is more predictable and varies little or not at all for long periods of time.

The connection which employs the cruciform or X-shaped or a similar socket 774 and the projection 724 can be used with advantage to prevent any movements of the clutch cover 722 and the secondary flywheel 703 relative to each other, but such connection is equally useful in many other types of apparatus or machines where two or more parts must be secured to each other in such a way that they are held against relative movement in a plurality of different directions. In other words, the utility of the connection which is shown in FIGS. 10-12 is not limited to utilization in an apparatus which is to be installed in the power train between the engine and the wheels or other ground-contacting elements of a vehicle.

The grooves 776 need not extend at right angles to the groove 775, i.e., the grooves 776 need not be exactly parallel to the axis of the secondary flywheel 703. All that counts is to provide the flywheel 703 with cruciform, X-shaped or similar or analogous sockets which provide room for more material than is absolutely necessary to establish a reliable connection against relative movements of the flywheel 703 and cover 722 in the axial and/or circumferential direction of the flywheel.

It is further clear that the grooves 776 need not be bounded by semicylindrical or other concave surfaces. Such surfaces are easier to form because the material of the flywheel 703 can be removed by a rotating drill or by an analogous material removing tool.

An advantage of a deforming technique which causes the material of the cover 722 to actually flow into the sockets 774 is that this ensures highly predictable filling of each socket 774, at least at or close to the intersection of the groove 775 with the respective axially parallel groove 776. Thus, a reliable connection is established as soon as at least some material of the cover 722 flows beyond the intersection proper so that it enters the channel 775 as well as the respective channel 776.

The illustrated tool 777, can be replaced with a tool having a semispherical, conical or polygonal working end without departing from the spirit of the invention.

Figure 13:
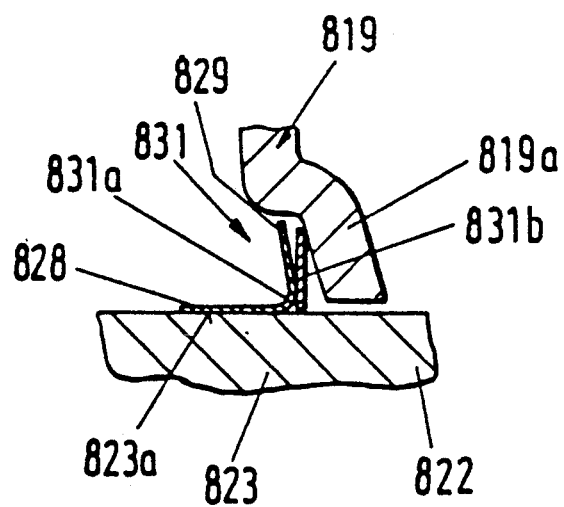
FIG. 13 is an enlarged fragmentary axial sectional view of a detail showing a presently preferred sealing element for use as a means for preventing escape of viscous fluid from the chamber for the damper or dampers of the improved apparatus.

FIG. 13 shows a sealing element 831 which can be utilized with advantage in the torque transmitting apparatus of FIG. 3 or in any other apparatus wherein a reliable seal must be established between a stationary part and a rotary part or between two rotary parts one of which rotates at a different speed and/or in a different direction. The sealing element 831 comprises a ring-shaped section or support 831a and a washer-like section 831b which is or can be installed in stressed condition not unlike a diaphragm spring. This composite sealing element 831 is installed between the frustoconical end portion 819a of the wall 819 and the external surface of cylindrical portion 823 of the cover 822. The wall 819 shares all angular movements of the primary flywheel (not shown in FIG. 13), and the cover 822 shares all angular movements of the secondary flywheel (which is assumed to be non-rotatably connected with the cylindrical portion 823). The axially extending leg 828 of the section 831a is adjacent the external surface 823a of the cylindrical section 823. The section 831a has a substantially L-shaped cross-sectional outline and its other leg 829 extends substantially radially of the cylindrical portion 823 but is preferably a conical frustum with a relatively large acute angle between the legs 828 and 829. Thus, the conicity of the right-hand side of the leg 829 need not be very pronounced. The leg 829 tapers in a direction radially outwardly of the external surface 823a and slightly toward the annular chamber (not shown) which is located to the left of FIG. 13 and is partially surrounded by the wall 819.

That surface of the end portion 819a which is adjacent the section 831b is a conical frustum which tapers in the same way as the leg 829 but not necessarily to the same extent. The section 831b between the leg 829 and the end portion 819a stores energy; the radially innermost part of the section 831b reacts against the junction of the legs 828, 829 and the radially outermost part of the section 831b bears against the frustoconical surface of the end portion 819a. The section 831a can be a force fit on the external surface 823a of the cylindrical portion 823; the external surface 823a is then finished with at least some degree of precision, e.g., in a grinding or polishing machine. Alternatively, a certain part of the cylindrical portion 823 (namely the part which is to be surrounded by the leg 828) is treated and calibrated in a stamping, upsetting, extruding, or other suitable machine.

In order to assemble the sealing element 831 of FIG. 13, the sections 831a, 831b are mounted on the cylindrical portion 823 of the cover 822 before the wall 819 is welded to the primary flywheel (note the welded joint 20 in FIG. 1) and the sections 831a, 831b assume axial positions beyond the final axial positions, i.e., further away from the primary flywheel. The next step involves positioning of the wall 819 adjacent the section 831b as shown in FIG. 13 and moving the wall 819 to the left so that it ultimately abuts the radially outermost portion (see the portion 18 in FIG. 1) of the primary flywheel. The primary flywheel and the wall 819 are then welded to each other (note the welded joint 20 of FIG. 1). As the wall 819 moves to the left, the end portion 819a stresses the section 831b so that the conicity of the section 831b is the same as that of the left-hand side of the end portion 819a, and any further leftward movement of the wall 819 entails a shifting of the section 831a along the external surface 823a of the cylindrical portion 823. The leftward movement of the wall 819 and of the sections 831a, 831b is terminated when the wall 819 reaches a proper axial position for welding to the adjacent portion (such as 18) of the primary flywheel. The zone in which the section 831b bears upon the end portion 819a and the magnitude of force which is to urge the section 831b against the end portion 819a are selected in such a way that the wall 819 undergoes a certain amount of elastic deformation not later than when it reaches the adjacent portion (18) of the primary flywheel. This ensures that the stressed wall 819 can dissipate some stored energy when the welding operation (at 20) is completed. Such dissipation of energy entails some rightward movement of the end portion 819a so that the section 831b can assume the angular position which is shown in FIG. 13. This suffices to ensure the establishment of a reliable sealing action between the end portion 819a on the one hand and the section 831a of the sealing element 831 on the other hand.

The improved apparatus is susceptible of many additional modifications without departing from the spirit of the invention. For example, the features of the apparatus 1 can be combined with those of the apparatus of FIGS. 2-13, the features of the apparatus 101 can be combined with those of the apparatus of FIGS. 1 and 3-13, and so forth.

Furthermore, the illustrated bearings between the primary and secondary flywheels can be replaced with a bearing which surrounds the holes for the screws that are used to secure the torque transmitting apparatus to the rotary output element of an engine. For example, the apparatus 301 of FIG. 5 can be modified in such a way that the entire bearing 306 is located radially outwardly of the set of holes 307 in the disc-shaped portion 314 of the primary flywheel 302.

The sealing means for the annular chamber which confines one or more dampers can be designed in such a way that at least one of its parts operates directly between the radially outermost portion of the secondary flywheel and a member which rotates with the primary flywheel. Thus, the secondary flywheel can bound a portion of the annular chamber.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of the aforedescribed contribution to the art and, therefore, such adaptations should and are intended to be comprehended within the meaning and range of equivalence of the appended claims.

What is claimed is:

1. A torque transmitting apparatus for use in motor vehicles, comprising a first rotary flywheel connectable with an engine of a vehicle; a second rotary flywheel connectable to a transmission of the vehicle by a friction clutch having a cover, a pressure plate on said cover, and a clutch plate between said pressure plate and a friction surface of said second flywheel; at least one damper operative to oppose rotation of said flywheels relative to each other and disposed in an annular chamber defined at least in part by said first flywheel; a supply of viscous fluid at least partially filling said chamber; and means for at least substantially sealing said chamber from the atmosphere, said friction surface having a radially innermost portion and a radially outermost portion and said chamber having a radially inner portion extending radially inwardly from the outermost portion toward the innermost portion of said friction surface and terminating at most midway between said innermost and outermost portions.

2. A torque transmitting apparatus for use in motor vehicles, comprising a first rotary flywheel connectable with an engine of a vehicle; a second rotary flywheel connectable with a transmission of a vehicle; and at least one damper operative to oppose rotation of said flywheels relative to each other and disposed in a sealed annular chamber which is defined at least in part by one of said flywheels, said flywheels having portions which define a clearance and confront each other radially inwardly of said chamber.

3. Apparatus for transmitting torque in a motor vehicle, comprising a first rotary flywheel having a substantially radially extending disc-shaped portion connectable with an engine of the vehicle; a second rotary flywheel connectable with a transmission of the vehicle by a friction clutch; at least one damper operative to oppose rotation of said flywheels relative to each other and disposed in an annular chamber defined in part by an axially extending portion rigid with said disc-shaped portion, said chamber having a radially outermost portion which is surrounded by said axially extending portion; and an annular wall adjacent said axially extending portion and bounding a portion of said chamber, said second flywheel having an annular friction surface adjacent a clutch plate of said friction clutch and said wall being disposed radially outwardly of said friction surface.

4. Apparatus for transmitting torque in motor vehicles, comprising a first rotary flywheel connectable with an engine of the vehicle; a second rotary flywheel connectable with a transmission of the vehicle by a friction clutch having a pressure plate and a clutch plate between said pressure plate and an annular friction surface of said second flywheel; at least one antifriction bearing between said flywheels; at least one damper operative to oppose rotation of said flywheels relative to each other and disposed in an annular chamber which is at least partially filled with a viscous fluid and is defined at least in part by one of said flywheels, said at least one damper having energy storing elements in a toroidal portion of said chamber; and means for at least substantially sealing said chamber from the atmosphere, said sealing means comprising a sealing element between a first component which is rotatable with said first flywheel and a second component which is rotatable with said second flywheel, said one flywheel having a surface bounding said toroidal portion of said chamber and closely following the outlines of adjacent portions of energy storing elements in said toroidal portion, said sealing element and said toroidal portion being located radially outwardly of said second flywheel.

5. A torque transmitting apparatus for use in motor vehicles, comprising a first rotary flywheel; a second rotary flywheel connectable with a transmission in a vehicle; at least one anti-friction bearing between said flywheels; said flywheels defining a passage which is surrounded by said at least one bearing; and means for fastening said first flywheel to a rotary output element of an engine in the vehicle, said fastening means comprising fasteners insertable into holes provided therefor in said first flywheel radially outwardly of said at least one bearing, said first flywheel having a side confronting said second flywheel and said fasteners being insertable into said holes from said side of said first flywheel, said second flywheel having openings in at least partial alignment with said holes.

6. Apparatus for transmitting torque in a motor vehicle, comprising a first rotary flywheel connectable to an engine of the vehicle; a second rotary flywheel connectable to a transmission of the vehicle by a friction clutch having a cover; and at lease one damper operative to oppose rotation of said flywheels relative to each other and disposed in an annular fluid-containing chamber defined in part by said first flywheel and in part by an annular wall secured to said first flywheel, extending substantially radially inwardly and closely following the outlines of energy storing elements forming part of said at least one damper and confined in said chamber, said wall and said cover consisting of the same material.

7. The apparatus of claim 6, wherein said cover includes a radially outer portion having a first outline and said annular wall includes a radially inner portion having a second outline at least substantially conforming to said first outline.

8. A torque transmitting apparatus for use in motor vehicles, comprising a first rotary flywheel connectable with an engine of a vehicle; a second rotary flywheel connectable with a transmission of the vehicle by a friction clutch having a cover; at least one damper operative to oppose rotation of said flywheels relative to each other; and at least one welded joint between said cover and said second flywheel, said flywheels and said friction clutch together constituting a preassembled unit connectable to a rotary output element of the engine.

9. A torque transmitting apparatus for use in motor vehicles, comprising a first rotary flywheel connectable with an engine of a vehicle; a second rotary flywheel connectable with a transmission of the vehicle by a friction clutch having a cover including an axially extending portion which surrounds said second flywheel, said axially extending portion having at least one projection extending into a radial recess of said second flywheel; and at least one damper operative to oppose rotation of said flywheels relative to each other.

10. A torque transmitting apparatus for use in motor vehicles, comprising a first rotary flywheel connectable with an engine of a vehicle; a second rotary flywheel connectable with a transmission of the vehicle by a friction clutch; at least one bearing between said flywheels; and at least one damper operative to oppose rotation of said flywheels relative to each other and disposed in an annular chamber defined at least in part by said first flywheel, said damper including energy storing elements acting in the circumferential direction of said flywheels and said clutch including a cover affixed to said second flywheel and including a substantially axially extending portion which at least partially surrounds said second flywheel, said second flywheel carrying stressing portions extending into said chamber and engaging said energy storing elements.

11. A torque transmitting apparatus for use in motor vehicles, comprising a first rotary flywheel connectable with an engine of a vehicle; a second rotary flywheel connectable with a transmission of the vehicle by a friction clutch and including a substantially radially extending friction surface having a radially outermost portion and a radially innermost portion; at least one bearing between said flywheels; and at least one damper operative to oppose rotation of said flywheels relative to each other and disposed in an annular chamber defined at least in part by said first flywheel and being at least substantially sealed from the atmosphere, said chamber having a radially inner portion extending radially inwardly from the outermost portion toward the innermost portion of said friction surface and terminating at most midway between said innermost and outermost portions, said damper including energy storing elements acting in the circumferential direction of said flywheels and said clutch including a cover affixed to said second flywheel and said second flywheel carrying stressing portions extending into said chamber and engaging said energy storing elements, said friction clutch further including a pressure plate on said cover and clutch plate between said pressure plate and said friction surface.

12. A torque transmitting apparatus for use in motor vehicles, comprising a first rotary flywheel connectable with an engine of a vehicle and including a portion which is immediately adjacent the engine; a second rotary flywheel connectable with a transmission of the vehicle by a friction clutch and having a substantially radially extending friction surface adjacent a clutch plate of said clutch, said second flywheel including a portion which is immediately adjacent said first flywheel and defines therewith a narrow clearance extending radially of said flywheels; at least one bearing between said flywheels; and at least one damper operative to oppose rotation of said flywheels relative to each other and disposed in an annular chamber defined at least in part by said first flywheel, said damper including energy storing elements acting in the circumferential direction of said flywheels and said clutch including a cover affixed to said second flywheel and said second flywheel carrying stressing portions extending into said chamber and engaging said energy storing elements.

13. A torque transmitting apparatus for use in motor vehicles, comprising a first rotary flywheel connectable with an engine of a vehicle; a second rotary flywheel connectable with a transmission of the vehicle by a friction clutch, said flywheels having portion which are immediately adjacent each other and define a narrow clearance and said second flywheel further having a friction surface adjacent a clutch plate of said friction clutch, said portion of said second flywheel having at least one opening disposed radially inwardly of said friction surface and communicating with said clearance; at least one bearing between said flywheels; and at least one damper operative to oppose rotation of said flywheels relative to each other and disposed in an annular chamber defined at least in part by said first flywheel, said damper including energy storing elements acting in the circumferential direction of said flywheels and said clutch further including a cover affixed to said second flywheel and said second flywheel carrying stressing portions extending into said chamber and engaging said energy storing elements.

14. A torque transmitting apparatus for use in motor vehicles, comprising a first rotary flywheel including a substantially radially extending disc-shaped portion connectable to a rotary output element of an engine of a vehicle and an axially extending annular portion rigid with said disc-shaped portion; a second rotary flywheel connectable with a transmission of the vehicle by a friction clutch and having an annular friction surface adjacent a clutch plate of said clutch; at least one bearing between said flywheels; at least one damper operative to oppose rotation of said flywheels relative to each other and disposed in an annular chamber defined in part by said first flywheel, said at least one damper including energy storing elements acting in the circumferential direction of said flywheels and said clutch further including a cover affixed to said second flywheel and said second flywheel carrying stressing portions extending into said chamber and engaging said energy storing elements, said chamber having a radially outermost portion which is surrounded by said annular portion; and an annular wall adjacent said annular portion and bounding a portion of said chamber, said wall being disposed radially outwardly of said second flywheel.

15. A torque transmitting apparatus for use in motor vehicles, comprising a first rotary flywheel connectable with an engine of a vehicle; a second rotary flywheel connectable with a transmission of the vehicle by a friction clutch, said flywheels having portions which directly define a narrow clearance and said portion of said first flywheel being immediately adjacent the engine, said portion of said second flywheel having a friction surface adjacent a clutch plate of said clutch; at least one bearing between said flywheels; at least one damper operative to oppose rotation of said flywheels relative to each other and disposed in an annular chamber defined at least in part by said first flywheel, said at least one damper including energy storing elements acting in the circumferential direction of said flywheels and said clutch further including a cover affixed to said second flywheel and said second flywheel carrying stressing portions extending into said chamber and engaging said energy storing elements; and a seal for said chamber, said seal being disposed in said clearance.

16. A torque transmitting apparatus for use in motor vehicles, comprising a first rotary flywheel connectable with an engine of a vehicle; a second rotary flywheel connectable with a transmission of the vehicle by a friction clutch, said flywheels defining a passage for a component of the transmission; at least one bearing between said flywheels, said passage being surrounded by said at least one bearing and said first flywheel having first holes disposed radially outwardly of said passage to receive rotary fasteners which secure the first flywheel to a rotary output element of the engine, said first openings being disposed radially outwardly of said at least one bearing and said second flywheel having second openings in at least partial alignment with said first openings to afford access to said fasteners extending into said first openings; and at least one damper operative to oppose rotation of said flywheels relative to each other and disposed in an annular chamber defined at least in part by said first flywheel, said at least one damper including energy storing elements acting in the circumferential direction of said flywheels and said clutch including a cover affixed to said second flywheel and said second flywheel carrying stressing portions extending into said chamber and engaging said energy storing elements.

17. A torque transmitting apparatus for use in motor vehicles, comprising a first rotary flywheel connectable with an engine of a vehicle; a second rotary flywheel connectable with a transmission of the vehicle by a friction clutch; said first flywheel having a first side facing away from and a second side facing toward said second flywheel, said first flywheel further having holes extending between said sides thereof; fasteners having heads adjacent said second side and externally threaded shanks extending through said holes to secure said first flywheel to a rotary output element of the engine, said second flywheel having second holes affording access to but preventing passage of the heads of said fasteners therethrough; at least one bearing between said flywheels; and at least one damper operative to oppose rotation of said flywheels relative to each other and disposed in an annular chamber defined at least in part by said first flywheel, said damper including energy storing elements acting in the circumferential direction of said flywheels and said clutch including a cover affixed to said second flywheel and said second flywheel carrying stressing portions extending into said chamber and engaging said energy storing elements.

18. A torque transmitting apparatus for use in motor vehicles, comprising a first rotary flywheel connectable with an engine of a vehicle and having holes; means for fastening said flywheel to a rotary output element of the engine, said fastening means including fasteners having portions extending into said holes; means for preventing complete withdrawal of said portions of said fasteners from the respective holes; a second rotary flywheel connectable with a transmission of the vehicle by a friction clutch; at least one bearing between said flywheels; and at least one damper operative to oppose rotation of said flywheels relative to each other and disposed in an annular chamber defined at least in part by said first flywheel, said at least one damper including energy storing elements acting in the circumferential direction of said flywheels and said clutch including a cover affixed to said second flywheel and said second flywheel carrying stressing portions extending into said chamber and engaging said energy storing elements.

19. A torque transmitting apparatus for use in motor vehicles, comprising a first rotary flywheel connectable with an engine of a vehicle and having first holes; means for fastening said first flywheel to a rotary output element of the engine, said fastening means including fasteners in said holes; a second rotary flywheel connectable with a transmission of the vehicle by a friction clutch, said flywheels and said friction clutch together constituting a preassembled unit which is connectable to the rotary output element of the engine by said fastening means; at least one bearing between said flywheels; and at least one damper operative to oppose rotation of said flywheels relative to each other and disposed in an annular chamber defined at least in part by said first flywheel, said damper including energy storing elements acting in the circumferential direction of said flywheels and said clutch including a cover affixed to said second flywheel and said second flywheel carrying stressing portions extending into said chamber and engaging said energy storing elements, said clutch further comprising a clutch plate and a diaphragm spring having second holes in at least partial alignment with said first holes so as to permit engagement of a tool with the fasteners in said first holes, said clutch plate having third holes each in at least partial alignment with one of said second holes and said clutch plate being disposed between said diaphragm spring and said first flywheel.

20. A torque transmitting apparatus for use in motor vehicles, comprising a first rotary flywheel connectable with an engine of a vehicle; a second rotary flywheel connectable with a transmission of the vehicle by a friction clutch, said first flywheel having a first side facing away from said friction clutch, a second side facing toward said friction clutch and holes extending between said first and second sides; means for fastening said first flywheel to a rotary output element of the engine, said fastening means including fasteners having heads at said second side and threaded shanks extending into said holes, said friction clutch having an internal space and said heads being receivable in said space in such positions that the shanks of said fasteners do not extend beyond the first side of said first flywheel; at least one bearing between said flywheels; and at least one damper operative to oppose rotation of said flywheels relative to each other and disposed in an annular chamber defined at least in part by said first flywheel, said damper including rotary energy storing elements acting in the circumferential direction of said flywheels and said clutch including a cover affixed to said second flywheel and said second flywheel carrying stressing portions extending into said chamber and engaging said energy storing elements, said flywheels, said at least one bearing, said at least one damper and said friction clutch together constituting a preassembled unit which is connectable to the output element of the engine by said fasteners and said preassembled unit further comprising means for preventing complete withdrawal of said shanks of said fasteners from the respective holes.

21. A torque transmitting apparatus for use in motor vehicles, comprising a first rotary flywheel connectable with an engine of a vehicle; a second rotary flywheel connectable with a transmission of the vehicle by a friction clutch; at least one antifriction bearing between said flywheels; and at least one damper operative to oppose rotation of said flywheels relative to each other and disposed in an annular chamber defined at least in part by said first flywheel, said at least one damper including energy storing elements acting in the circumferential direction of said flywheels and said clutch including a cover affixed to said second flywheel and said second flywheel carrying stressing portions extending into said chamber and engaging said energy storing elements, said cover including an axially extending radially outer portion and said chamber surrounding said axially extending portion.

22. A torque transmitting apparatus for use in motor vehicles, comprising a first rotary flywheel connectable with an engine of a vehicle; a second rotary flywheel connectable with a transmission of the vehicle by a friction clutch; at least one bearing between said flywheels; and at least one damper operative to oppose rotation of said flywheels relative to each other and disposed in an annular chamber defined at least in part by said first flywheel, said at least one damper including energy storing elements acting in the circumferential direction of said flywheels and said clutch including a cover affixed to said second flywheel and said second flywheel carrying stressing portions extending into said chamber and engaging said energy storing elements, said cover including an axially extending radially outer portion and said stressing portions being provided on said axially extending portion, said stressing portions being disposed substantially radially of said axially extending portion.

23. A torque transmitting apparatus for use in motor vehicles, comprising a first rotary flywheel connectable with an engine of a vehicle; a second rotary flywheel connectable with a transmission of the vehicle by a friction clutch; at least one bearing between said flywheels; and at least one damper operative to oppose rotation of said flywheels relative to each other and disposed in an annular chamber defined at least in part by said first flywheel, said at least one damper including energy storing elements acting in the circumferential direction of said flywheels and said clutch including a cover affixed to said second flywheel and said second flywheel carrying stressing portions extending into said chamber and engaging said energy storing elements, said cover including an axially extending radially outer portion and said energy storing elements being radially outwardly adjacent said axially extending portion.

24. A torque transmitting apparatus for use in motor vehicles, comprising a first rotary flywheel connectable with an engine of a vehicle; a second rotary flywheel connectable with a transmission of the vehicle by a friction clutch; at least one bearing between said flywheels; at least one damper operative to oppose rotation of said flywheels relative to each other and disposed in an annular chamber defined at least in part by said first flywheel, said damper including energy storing elements acting in the circumferential direction of said flywheels and said clutch including a cover affixed to said second flywheel and said second flywheel carrying stressing portions extending into said chamber and engaging said energy storing elements; and a thermal insulator between said cover and said second flywheel.

* * * * *